(12) United States Patent
Uetsuka et al.

(10) Patent No.: US 10,613,412 B2
(45) Date of Patent: Apr. 7, 2020

(54) LIGHT BEAM DEFLECTING ELEMENT, WAVELENGTH-SELECTIVE CROSS-CONNECT DEVICE USING SAME, AND OPTICAL CROSS-CONNECT DEVICE

(71) Applicant: NATIONAL INSTITUTE OF ADVANCED INDUSTRIAL SCIENCE & TECHNOLOGY, Tokyo (JP)

(72) Inventors: Hisato Uetsuka, Tsukuba (JP); Shu Namiki, Tsukuba (JP); Hitoshi Kawashima, Tsukuba (JP); Kazuhiro Ikeda, Tsukuba (JP)

(73) Assignee: NATIONAL INSTITUTE OF ADVANCED INDUSTRIAL SCIENCE, Tokyo (JP)

( * ) Notice: Subject to any disclaimer, the term of this patent is extended or adjusted under 35 U.S.C. 154(b) by 26 days.

(21) Appl. No.: 15/570,197

(22) PCT Filed: Apr. 18, 2016

(86) PCT No.: PCT/JP2016/062233
§ 371 (c)(1),
(2) Date: Oct. 27, 2017

(87) PCT Pub. No.: WO2016/175071
PCT Pub. Date: Nov. 3, 2016

(65) Prior Publication Data
US 2018/0143508 A1 May 24, 2018

(30) Foreign Application Priority Data
Apr. 27, 2015 (JP) .................................. 2015-090587

(51) Int. Cl.
*G02F 1/29* (2006.01)
*G02F 1/31* (2006.01)
*G02F 1/13* (2006.01)

(52) U.S. Cl.
CPC . *G02F 1/31* (2013.01); *G02F 1/13* (2013.01)

(58) Field of Classification Search
CPC .... G02B 5/3016; G02B 6/124; G02B 27/286; G02F 1/1323; G02F 1/1347; G02F 2201/305; G02F 2203/24
(Continued)

(56) References Cited

U.S. PATENT DOCUMENTS 8,797,638 B2 8/2014 Hotta
2003/0179426 A1 9/2003 Ide
(Continued)

FOREIGN PATENT DOCUMENTS

JP 2006-84501 A 3/2006
JP 2012-505430 A 3/2012
(Continued)

OTHER PUBLICATIONS

*Mems Tilt Mirror Array for Optical Switch*, NTT Technical Journal, Jul. 2007, pp. 24-27.
(Continued)

*Primary Examiner* — Mahidere S Sahle
(74) *Attorney, Agent, or Firm* — Workman Nydegger

(57) ABSTRACT

A conventional optical switching engine has difficulty in producing a universal multiport switching engine being capable of (i) programmatically changing regions to be switched, (ii) generating no wavelength dependent loss, (iii) having a small Walk-off, and (iv) being usable for small to large light beams. Produced is a light beam deflecting element in which a polarization grating is fitted in parallel on an N×M transmissive birefringence modulator formed such (Continued)

that a transmissive variable half-wavelength liquid crystal plate is divided into rectangular extreme small pixels, and many N and M pixels thus obtained are respectively arranged in X and Y axes directions in a matrix form, the polarization grating being a grating in which a period $\Lambda$ changes in an X' axis direction (direction to which a birefringence axis rotates) in accordance with a wavelength width of light.

19 Claims, 18 Drawing Sheets

(58) Field of Classification Search
USPC .............. 349/1, 196, 202, 96; 359/316, 320, 359/485.01, 489.15
See application file for complete search history.

(56) References Cited

U.S. PATENT DOCUMENTS

| | | | |
|---|---|---|---|
| 2007/0109400 A1* | 5/2007 | Woodgate | G02B 27/2214 348/47 |
| 2011/0242461 A1 | 10/2011 | Escuti et al. | |
| 2012/0188467 A1 | 7/2012 | Escuti et al. | |
| 2012/0218763 A1 | 8/2012 | Saikawa et al. | |
| 2013/0194537 A1 | 8/2013 | Mao et al. | |
| 2013/0202246 A1 | 8/2013 | Meade et al. | |
| 2014/0016182 A1 | 1/2014 | Hotta | |
| 2014/0361990 A1 | 12/2014 | Leister | |

FOREIGN PATENT DOCUMENTS

| | | |
|---|---|---|
| JP | 2014-21190 A | 2/2014 |
| JP | 2015-505995 A | 2/2015 |
| JP | 2015-509216 A | 3/2015 |
| WO | 2011/058599 A | 5/2011 |
| WO | 2014/015129 A1 | 1/2014 |

OTHER PUBLICATIONS

Nicolas K. Fontaine et al., *NxM Wavelength Selective Crossconnect with Flexible Passbands*, OFC/NFOEC Postdeadline Papers, 2012, pp. 3

International Search Report dated Jul. 19, 2016, issued in PCT Application No. PCT/JP2016/062233, filed Apr. 18, 2016.

International Preliminary Report on Patentability dated Oct. 31, 2017, issued in PCT Application No. PCT/JP2016/062233, filed Apr. 18, 2016.

Mcmanamon P F et al: A Review of Phased Array Steering for Narrow-Band Electrooptical Systems, IEEE j vol. 97, No., Jun. 6, 2009.

Kim, et al.; Wide-angle, nonmechanical beam steering using thin liquid crystal polarization gratings, Visual Communications and Image Processing; vol. 7093, Aug. 14, 2008, XP002606928.

Extended European Search Report dated Nov. 26, 2018 in corresponding European Patent Application No. 16786348.9

* cited by examiner (a)
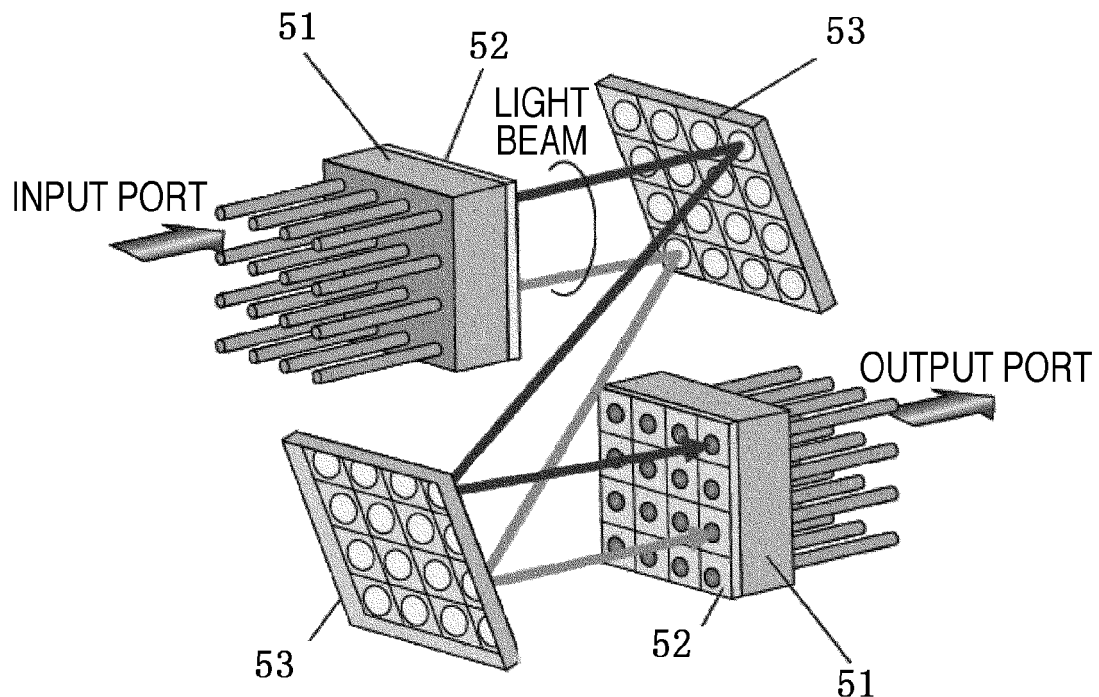
(b)
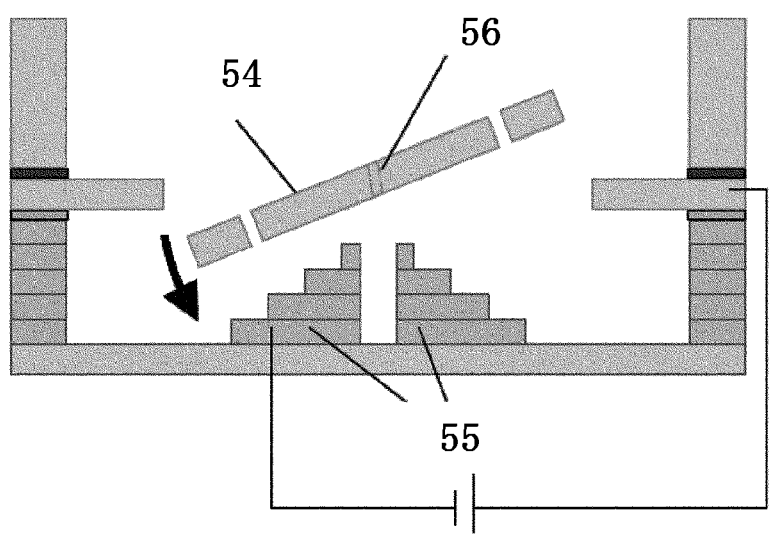
PRIOR ART
FIG.5

○ = Right Handed Circular Polarization (RCP),
◌ = Left Handed Circular Polarization (LCP)

LIGHT BEAM DEFLECTING ELEMENT, WAVELENGTH-SELECTIVE CROSS-CONNECT DEVICE USING SAME, AND OPTICAL CROSS-CONNECT DEVICE

TECHNICAL FIELD

The present patent is for use as a switching engine for reconfigurable optical add/drop multiplexing (ROADM), which is necessary for next-generation optical communication systems.

BACKGROUND ART

FIG. 1 illustrates one configuration example of a certain ROADM node device in a mesh network.

In optical networks, an optical fiber is generally duplexed with a pair of optical fibers 1 so as to prevent the optical communication from being disconnected even when a break of an optical fiber or a failure of a transmission device occurs.

For example, in a method called 1+1 protection, optical signals are simultaneously transmitted in a direction of West→East through one of the pair of optical fibers 1 and in a direction of East→West through the other, and when the main optical fiber (West→East) is broken, the main optical fiber is instantaneously switched to the other optical signal (East→West), and thereby prevents a failure.

This node has a configuration having pairs optical fibers 1 in three directions (referred to as 3 Degree), in other words, the pairs of optical fibers 1 are laid toward three respective nodes positioned in the West, East, and North directions.

Hereinafter, an operation of this node will be described.

This node includes an Express Traffic device 2 and an Add/Drop Traffic device 3.

Herein, in the optical fiber of the pair of optical fibers 1 in which signals are transmitted in the direction of West→East, wavelength signals of approximately 100 waves are multiplexed, and are wave-split using a 1×N WSS (Wavelength Selective Switch). Two of output ports of the 1×N WSS are directed toward the East and the North, and are connected to 1×N WSSs that are disposed opposed to them. The remaining output ports are connected to two transponder banks (transponder bank # A4, transponder bank # B5) included in the Add/Drop Traffic device 3.

This allows an optical signal having a desired wavelength to be extracted, or an optical signal having a new wavelength to be inserted.

In this manner, in the Express Traffic device 2, the 1×N WSS devices are disposed opposed to each other, and ports thereof are connected to each other.

With the development of the optical networks in the future, the number of degrees tends to increase, and a larger number of 1×N WSSs become necessary.

Meanwhile, in the case of adding Degree, a 1×N WSS is newly installed, and optical patch fibers between the new and existing 1×N WSSs are required to be manually connected.

FIG. 2 illustrates an example of the configuration of an Add/Drop Traffic device.

In this example, a transponder bank is divided into a receiver (RX) bank 21 and a transmitter (TX) bank 22 for convenience, but actually is a transponder bank including a TX and RX bank.

Firstly, the receiver bank 21 will be described.

Optical signals (multiplexed wavelength signals) from the Express Traffic device 1 are amplified by optical amplifiers 23, and then are each divided by a 1×8 optical splitter 24 into eight branches, which are respectively inputted into 1×8 optical switches 25 connected to the respective receivers (RXs).

The 1×8 optical switch 25 uses a method of selecting optical signals of one degree from optical signals transmitted from the respective degrees, and further taking out a signal of one wavelength from the multiplexed optical signals by using a wavelength variable filter 26.

Meanwhile, in the transmitter (TX) bank 22, optical signals from the transmitters (TXs) are transmitted to a desired degree using the 1×8 optical switches 25.

In this manner, the degrees, the receivers (RXs), and the transmitters (TXs) are configured to be cross-connected by a method of multicast and select.

It should be noted that the receivers (RXs) including the wavelength variable filters 26 have a wavelength cross-connect configuration, and the transmitters (TXs) including no wavelength variable filters 26 are equivalent to an optical cross-connect configuration.

The method in this example is that the eight receivers (RXs) and the eight transmitters (TXs) are cross-connected, and this number is decided mainly depending on the amplification performance of the optical amplifiers.

Optical signals of about several tens to 100 waves are generally multiplexed per optical fiber.

Accordingly, in the case of 3 degree, by considering the duplexing, optical signals of about 600 waves at maximum in total are present.

Assuming that 50% of these optical signals are branched and inserted in the node, optical signals of about 300 wavelengths are required to be handled in the transponder bank.

In this example, since one transponder bank includes eight receivers (RXs) and eight transmitters (TXs), only eight waves can be handled per one transponder bank.

Thirty eight transponder banks are required for handling all optical signals of 300 wavelengths, which increases the size of the devices and the complication.

Moreover, the costly optical amplifiers 23, and many components including the 1×8 optical switches 25, the 1×8 optical splitters 24, and the optical filters 26 become necessary, so that there has been a problem of the upsizing and the increased cost of the devices as a whole.

To address this, an N×M wavelength cross-connect (WXC) device illustrated in FIG. 3 and an optical cross-connect (OXC) device illustrated in FIG. 5 have been proposed.

Firstly, the N×M wavelength cross-connect (WXC) device in FIG. 3 will be described (Non Patent Literature 1).

FIG. 3(a) is a top view, and FIG. 3(b) is a side view.

The N×M wavelength cross-connect (WXC) device includes an input port 34, an output port 35, lenses 33, gratings 32, switching engines 31, and a Fourier lens 36, which are arranged in one direction, and cross-connects optical signals for every wavelength using the two switching engines 31 (in this case, Liquid Crystal on Silicon (LCOS)).

Although this example is complicated, an optical system between the two switching engines 31 in a switching plane (FIG. 3(a)) is a basically Fourier optical system, and the number of ports M that can be handled is given by Equation (3).

[Equation 3]

$$M = \frac{\Delta\theta}{a}\sqrt{\frac{f\pi}{\lambda}} \quad (3)$$

Here, f indicates an equivalent focal length of the Fourier optical system, Δθ indicates a deflection angle of the light beam, a indicates a fill factor (a=R/w, where R is a half pitch of the light beam on the LCOS, and w is a spot radius of the light beam on the LCOS), and λ indicates a wavelength.

Here, a is about 1.5 to 2.0.

FIG. 4(a) illustrates a LCOS (Liquid Crystal On Silicon) that is a switching engine used in the related art.

In this LCOS, metal electrodes 42 are formed on an electronic circuit substrate 41, a transparent electrode 44 that is formed on a lower surface of an upper glass substrate 43, and liquid crystals 45 are inserted between the metal electrodes 42 and the transparent electrode 44. Then, when a voltage is applied to the metal electrodes 42, birefringent molecules of the liquid crystals 45 are rotated to provide a refractive index distribution in a stepped form pattern.

This controls the phase of incident light, thereby deflecting the light beam.

FIG. 4(c) illustrates a relation between the Blaze period N (the number of pixels for one period being 0 to 2π) of pixels (corresponding to the metal electrodes 42) of the LCOS and the loss.

When N becomes about 5 or less, the loss suddenly increases. Meanwhile, the deflection angle of the LCOS is expressed by Equation (4).

[Equation 4]

$$\tan\theta \cong \frac{\lambda}{N\cdot\Delta} \quad (4)$$

Here, θ indicates the deflection angle, λ indicates the wavelength, N indicates the Blaze period, and Δ indicates the pixel pitch.

From FIG. 4(c), considering that N=about 5 or more is necessary for deflecting the light beam at the low loss, the pixel pitch Δ is necessary to be reduced in order to obtain a large deflection.

However, if the pixel pitch Δ, in other words, the pitch of the metal electrodes 42 is narrowed, the loss sharply increases due to the extended electric field (fringing effect) as illustrated in FIG. 4(b).

Therefore, the pixel pitch Δ is currently set to about 8 μm. The deflection angle θ is as small as about 2° from Equation (4), and it is impossible to make the deflection angle θ large.

FIG. 5(a) illustrates an example of a conventional optical cross-connect (OXC) device (Non Patent Literature 2).

In this example, two-dimensional MEMS mirrors are used to two-dimensionally control the deflection of light beams.

The optical cross-connect (OXC) device includes an optical fiber array 51, a micro lens array 52 for collimating, and two-dimensional MEMS mirrors 53.

Mirror angles of the two two-dimensional MEMS mirrors 53 are adjusted to optical cross-connect light beams between an input port and an output port.

The number of ports that can be handled is given by Equation (5).

[Equation 5]

$$M = \frac{\Delta\theta^2}{9\alpha^2}\left(\frac{f\pi}{\lambda}\right) \quad (5)$$

Here, f indicates a focal length of the Fourier optical system, Δθ indicates a deflection angle of the light beam, a indicates a fill factor (a=R/w, wherein R is a radius of the MEMS mirror, and w is a spot radius of the light beam on the MEMS mirror), and λ indicates a wavelength.

Here, a is about 1.5 to 2.0.

FIG. 5(b) illustrates a cross section structure as an example of the MEMS mirror.

When the voltage is applied to drive electrodes 55 formed in a stepped shape, a mirror 54 inclines around a hinge 56.

If the mirror 54 inclines at a large angle, a Pull-in occurs in which the mirror 54 cannot return, and the inclination angle is limited to about ±1°. Thus, a deflection angle of this MEMS mirror is approximately ±2°, which is about twice of the inclination angle.

From the foregoing, the deflection angle by the LCOS or the MEMS mirror in the related art is several degrees at most, and the number of ports is estimated as about several tens at most in accordance with Equation (3) indicating the number of ports of the wavelength cross-connect device. Therefore, if the number of ports is increased, the devices are extremely large in size (increase in f).

Moreover, in the case of Equation (5) indicating the number of ports of the optical cross-connect device, the focal length of about 1 m is necessary in order to implement the port scale of 256×256 even by using the two-dimensional MEMS mirror, which results in the upsizing of the device and the increased size of the switching engine because the spot of light beam diffracts and becomes large, so that the cost is increased.

As a steering element that can have a large deflection angle, the steering element in which liquid crystal half-wavelength plates and polymer polarization gratings are alternately stacked is disclosed (Patent Literature 1).

FIG. 6 illustrates an example thereof.

This switching engine is obtained such that liquid crystal half-wavelength plates 61 and polymer polarization gratings 62 are alternately stacked.

The polarization grating 62 is formed such that the orientations of birefringent molecules arranged on a film in-plane (x-y plane) change in an x axis direction at a period ∧, as illustrated in FIG. 7.

A circular polarization state after the light passes through the polarization grating 62 is the reverse of a circular polarization state before the light is incident (the right-handed direction changes to the left-handed direction, the left-handed direction changes to the right-handed direction).

The light that is vertically (in a z axis direction) incident to this film deflects in the right and left direction (+X direction, −X direction) depending on the right-handed direction and left-handed direction of the circular polarization.

The deflection angle is given by the following Equation.

[Equation 6]

$$\sin\theta = m\frac{\lambda}{\wedge} + \sin\theta_{in} \quad (6)$$

Here, λ indicates the wavelength, ∧ indicates the period of the polarization grating 62, θin indicates the incident angle, θ indicates the output polarization angle, and m indicates the order and has a value of ±1 in accordance with the polarization angle.

As for the polarization grating 62, there are two types of a liquid crystal type and a polymer type, the polymer type is a passive element, and the liquid crystal type can erase the polarization grating or reproduce the polarization grating, by changing the voltage.

The explanation is made referring back to FIG. 6.

Herein, the polarization gratings 62 of the passive type are used.

(a) illustrates an overall view, and (b) illustrates an operation view.

The method is that the direction (right-handed direction or left-handed direction) of the circular polarization of incident light is changed to switch the angle by 1×2 for each stage.

The polarization gratings 62 are stacked to allow many switching angles to be implemented, for example, when N polarization gratings 62 are stacked, 2N angles can be implemented.

Moreover, changing the periods of the polarization gratings 62 stacked can control the angle that allows the maximum deflection.

However, this conventional example indicates that the liquid crystal half-wavelength plate 61 can include one or many electrodes, however, this method is applied to the N×N wavelength cross-connect device or the N×N optical cross-connect device to cause the following problems, and it is difficult to introduce this method into practical systems.

(1) In a Case of the N×N Wavelength Cross-Connect Device (i) The conventional example reports that one light beam is deflected, however, when this method is applied to the N×N wavelength cross-connect device, many light beams incident from many input ports (for example, 100 ports) and having different wavelengths (for example, 100 wavelengths) are required to be individually and independently switched. Moreover, regions to be switched of many light beams having different wavelengths are required to programmatically changed, because the number of wavelengths thereof and the wavelength widths thereof are temporally changed.

(ii) In the case of the N×N wavelength cross-connect device, light beams having various wavelengths are incident into this switching engine as described the above, and those are required to be switched for every wavelength. However, the periods ∧ are constant in the x axis direction in the conventional method, so that the polarization angle differs for every wavelength, thereby resulting in generation of the wavelength dependent loss.

(iii) This method is a method of conducting a 1×2 switch for each stage in tandem. The angle of switching changes by 2p (p is the number of plates stacked) but not in an analog fashion. The number of p is required to increase in order to switch the light beams in many ports by this method, however, the starting points of light beams in the final plane are spread out (Walk-off) due to the thicknesses of all the liquid crystal half-wavelength plates. This Walk-off causes the beams, which are originally required to be in parallel, to have different angles in the wavelength cross-connect device, thereby significantly increasing the loss.

(iv) It is difficult to implement the light beams having various magnitudes and the various numbers of light beams as one switching engine, and is impossible to implement a universal switching engine.

(2) In a Case where this Method is Applied to the N×N Optical Cross-Connect Device (i) This method is a method of conducting a 1×2 switch for each stage in tandem. The angle of switching changes by 2N (N is the number of plates stacked) but not in an analog fashion. The number of N is required to increase in order to switch in many ports by this method, however, the starting points of light beams in the final plane are spread out (Walk-off) due to the thicknesses of the liquid crystal half-wavelength plates. This Walk-off causes the beams, which are originally in parallel, to have different angles in the optical cross-connect device, thereby significantly increasing the loss.

(ii) It is difficult to implement the light beams having various magnitudes and the various numbers of light beams as one switching engine, and is impossible to implement a universal switching engine.

CITATION LIST

Patent Literature

PTL 1: US patent, US 2012/0188467, "BEAM STEERING DEVICES INCLUDING STACKED LIQUID CRYSTAL POLARIZATION GRATING AND RELATED METHODS OF OPERATION"

Non Patent Literature

NPL 1: "N×M Wavelength Selective Crossconnect with Flexible Passbands", Nicolas K. Fontaine, Roland Ryf, David T. Neilson, PdP5B. 2 OFC/NFOEC Postdeadline Papers, 2012

NPL 2: "Mems Tilt Mirror Array for Optical Switch", NTT Technical Journal, July 2007, p 24-p 27

SUMMARY OF INVENTION

Technical Problem

The present patent provides a universal multiport switching engine that is capable of (i) programmatically changing regions to be switched, (ii) generates no wavelength dependent loss, (iii) has a small Walk-off, and (iv) is usable for small to large light beams, which have been difficult to achieve by the conventional switching engine.

Solution to Problem

With aspects of the present invention, used is an N×M transmissive birefringence modulator formed such that a transmissive variable half-wavelength liquid crystal plate, which is the related art illustrated in FIG. 6, is divided into rectangular extreme small pixels, and many N and M pixels are respectively arranged in X and Y axes directions in a matrix form and a polarization grating in which a period ∧ changes in an X' axis direction (direction to which the birefringence axis rotates) in accordance with the used wavelength width is fitted on the N×M transmissive birefringence modulator.

When being fitted, the polarization grating is aligned such that the X' axis around which the birefringence axis thereof rotates is substantially in parallel with the X axis or the Y axis of the N×M transmissive birefringence modulator.

Several pairs each having the N×M transmissive birefringence modulator and the polarization grating produced in this manner are stacked with such high accuracy that the pixels may coincide with each other when seen from a Z direction through which the light propagates.

Moreover, in order to make the Walk-off small, as a material of the N×M transmissive birefringence modulator, Si or Ge that is a material having a refractive index and being transparent in the wavelength region of the optical communication is used as a substrate.

Although, as a material other than this material, glass is used in the conventional example as an example, the Walk-off becomes large and the usage purpose is limited.

In addition, in the present patent, the size of the above-mentioned pixel is made smaller than the spot size of the light beam to be used, two or more pixels are grouped as if one element, and one light beam is deflected.

This can implement a universal switching engine that can correspond to many spot sizes.

The present patent can specifically provide the following aspects.

(1)

A light beam deflecting element 11 characterized in that a polarization grating 82 is fitted on an N×M transmissive birefringence modulator 81 of an active type, the N×M transmissive birefringence modulator 81 including a substrate A 93 in which N and M substantially rectangular pixels 90 each having an electronic circuit 91 and a transparent electrode 95 are respectively formed in X and Y axes directions orthogonal to each other in a matrix form on a Si substrate or a Ge substrate, a substrate B 96 in which a transparent electrode 94 is formed on one surface on a Si substrate or a Ge substrate, and birefringent liquid crystals 92 inserted between the substrate A 93 and the substrate B 96, the polarization grating 82 configured by orthogonal two axes (X' axis, Y' axis) in which a birefringence axis is rotating in one axis (X' axis) direction at a period $\wedge$ (excluding a constant period) that gradually changes in accordance with a wavelength, and the polarization grating 82 aligned such that the X axis and the X' axis or the Y axis and the X' axis are substantially in parallel.

(2)

A light beam deflecting element 11 characterized in that an N×M transmissive birefringence modulator (81) of a passive matrix type is disposed between a surface of a quarter wavelength film (111) in which light is incident from a back surface thereof and a surface of a quarter wavelength film (111) in which light is emitted from a back surface thereof, the N×M transmissive birefringence modulator (81) including M×N intersections (hereinafter, called pixels) that N line-shaped electrodes disposed on a surface of a Si substrate or a Ge substrate in an X axis direction and M line-shaped electrodes disposed on a surface of a Si substrate or a Ge substrate in a Y axis direction orthogonal to the X axis direction constitute with ferroelectric liquid crystals (102) inserted between the two kinds of the line-shaped electrodes, the N×M transmissive birefringence modulator (81) configured to operate as a half-wavelength plate by operating the electrodes of the pixels, and a polarization grating 82 configured by orthogonal two axes (X' axis, Y' axis) in which a birefringence axis is rotating in one axis (X' axis) direction at a period $\wedge$ (excluding a constant period) that gradually changes in accordance with a wavelength is fitted on the surface of the quarter wavelength film 111 in which the light is emitted such that the X axis and the X' axis or the Y axis and the X' axis are substantially in parallel.

(3)

The light beam deflecting element 11 according to (1) or (2), characterized in that the polarization grating 82 fitted has a film shape with several micrometers, and the film shaped polarization grating 82 is directly bonded to the N×M transmissive birefringence modulator 81 of the active type according to (1) or directly on the surface of the quarter wavelength film 111 in which the light is emitted according to (2).

(4)

The light beam deflecting element 11 according to (1) or (2), characterized in that the period $\wedge$ of the polarization grating 82 in which the birefringence axis is rotating at the gradually changes period $\wedge$ (excluding the constant period) in the X' axis direction gradually changed by several percent in the X' axis direction.

(5)

The light beam deflecting element 11 according to (4), characterized in that the period $\wedge$ of the polarization grating 82 gradually changes with respect to the X' axis so as to have a constant deflection angle of a the wavelength within a predetermined range with respect to the X' axis, and the change of the period $\wedge$ is a substantially linear change.

(6)

The light beam deflecting element 11 according to (4) or (5), characterized in that the period $\wedge$ of the polarization grating 82 changes by a change of ±10% or less (0.99 $\wedge$c to 1.01 $\wedge$c, 0.98 $\wedge$c to 1.02/$\wedge$c, 0.97 $\wedge$c to 1.03 $\wedge$c, or . . . , $\wedge$c is a center period).

(7)

The light beam deflecting element 11 according to (1), characterized in that by changing voltages applied to the transparent electrode 95 on the substrate A 93 and the transparent electrode 94 on the substrate B 96 of the N×M transmissive birefringence modulator 81 of the active type, an operation of the N×M transmissive birefringence modulator 81 of the active type on light substantially vertically (Z direction) passing through the N×M transmissive birefringence modulator 81 changes from an anisotropic birefringent state as in a half wavelength plate or a quarter wavelength plate to an isotropy state where no birefringence is caused.

(8)

A light beam deflecting element 80 characterized in that a plurality of the light beam deflecting elements 11 according to any one of (1) to (7) are used, and the two or more light beam deflecting elements 11 are stacked on one another such that the pixels of the light beam deflecting elements 11 roughly coincide with one another when seen in Z direction through which light passes.

(9)

The light beam deflecting element 80 according to (8), the light beam deflecting element 80 is characterized in that the periods $\wedge$ of the polarization gratings 82 of the stacked light beam deflecting elements 11 are different from one another with respect to a stacking direction (the Z direction).

(10)

The light beam deflecting element 80 according to (9), characterized in that the periods $\wedge$ of the polarization gratings 82 of the stacked light beam deflecting elements 11 become smaller and smaller by approximately ½ each.

(11)

The light beam deflecting element 80 according to (9), characterized in that the light beam deflecting elements 11 are stacked such that the periods $\wedge$ of the polarization gratings 11 of the stacked light beam deflecting elements 11 gradually become smaller from one side.

(12)

The light beam deflecting element 80 according to any one of (8) to (11), characterized in that the light beam deflecting elements 11 each having a thickness 1 mm or less are stacked.

(13)

A method of using the light beam deflecting element 80 according to any one of (8) to (12), characterized in that the light beam deflecting element 80 is configured such that at least two or more pixels 90 are included in a spot of an incident light beam 97.

(14)

The light beam deflecting element 80 according to any one of (8) to (11), characterized in that the light beam deflecting elements 11 are stacked such that the X' axis of the polarization grating 82 included in at least one of the stacked light beam deflecting elements 11 is orthogonal to the X' axis of the other light beam deflecting elements 11.

(15)

The light beam deflecting element 11 according to any one of (1) to (6), characterized in that an electronic circuit 91 constituting the N×M transmissive birefringence modulator 81 of the active type is a thin film transistor (TFT).

(16)

A wavelength cross-connect optical system 143 characterized in that two same light beam deflecting elements 11, 80 according to any one of (1) to (12), (14) and (15) are used to be opposed to each other, in an approximately middle point between the light beam deflecting elements (11, 80), a surface of a cylindrical lens A 141d having a focal length F, the surface having a curved surface power, i.e., a plane on which light is refracted, is disposed in parallel with a switching plane, and two cylindrical lenses B 141c each having a focal length F' are each disposed in a middle point between the cylindrical lens A (141d) and either of the light beam deflecting elements 11, 80 such that the curved surface of the cylindrical lens A and a curved surface of the cylindrical lens B 141c are orthogonal to each other, and a relation of the following Equation (8) is established between the focal length F and the focal length F':

[Equation 8] $F=2F'$ (8).

(17)

A wavelength cross-connect device comprising the wavelength cross-connect optical system 143 according to (16), a grating 142, a fiber array 140, and lenses 141a, 141b assembled together.

(18)

A cross-connect optical system 152 characterized in that in an optical system in which two same light beam deflecting elements 11, 80 according to any one of (1) to (12), (14) and (15) are used to be opposed to each other with an interval of L, and a lens 150 having a focal length F is disposed an approximately middle point between the beam deflecting elements 11, 80, and a relation of the following Equation (9) is established:

[Equation 9] $L=2F$ (9).

Advantageous Effects of Invention

The present invention aims to provide a switching engine for a multi-port wavelength cross-connect device or an optical cross-connect device, which has been difficult to provide by the conventional switching engine.

BRIEF DESCRIPTION OF DRAWINGS

FIG. 4(a) is a diagram illustrating a relation among the LCOS (Liquid Crystal On Silicon), the refractive index, the incidence, and the emission. FIG. 4(b) is an explanatory view of an extended electric field (fringing effect). FIG. 4(c) is diagram illustrating a relation between the Blaze period N (the number of pixels for one period being 0 to 2π) of pixels (corresponding to the metal electrodes 42) of the LCOS and the loss;

FIG. 5 illustrates a conventional optical cross-connect (OXC) device;

FIG. 9(a) is a front view, and FIG. 9(b) is a cross-sectional view;

FIG. 14(a) is a top view (X-Z plane), and FIG. 14(b) is a side view (Y-Z plane);

FIG. 16(a) is a front view, and FIG. 16(b) is a cross-sectional view;

FIG. 17(a) is a front view, and FIG. 17(b) is a side view; FIG. 18(a) is a front view, and FIG. 18(b) is a side view.

DESCRIPTION OF EMBODIMENTS

Embodiment 1

Figure 1:
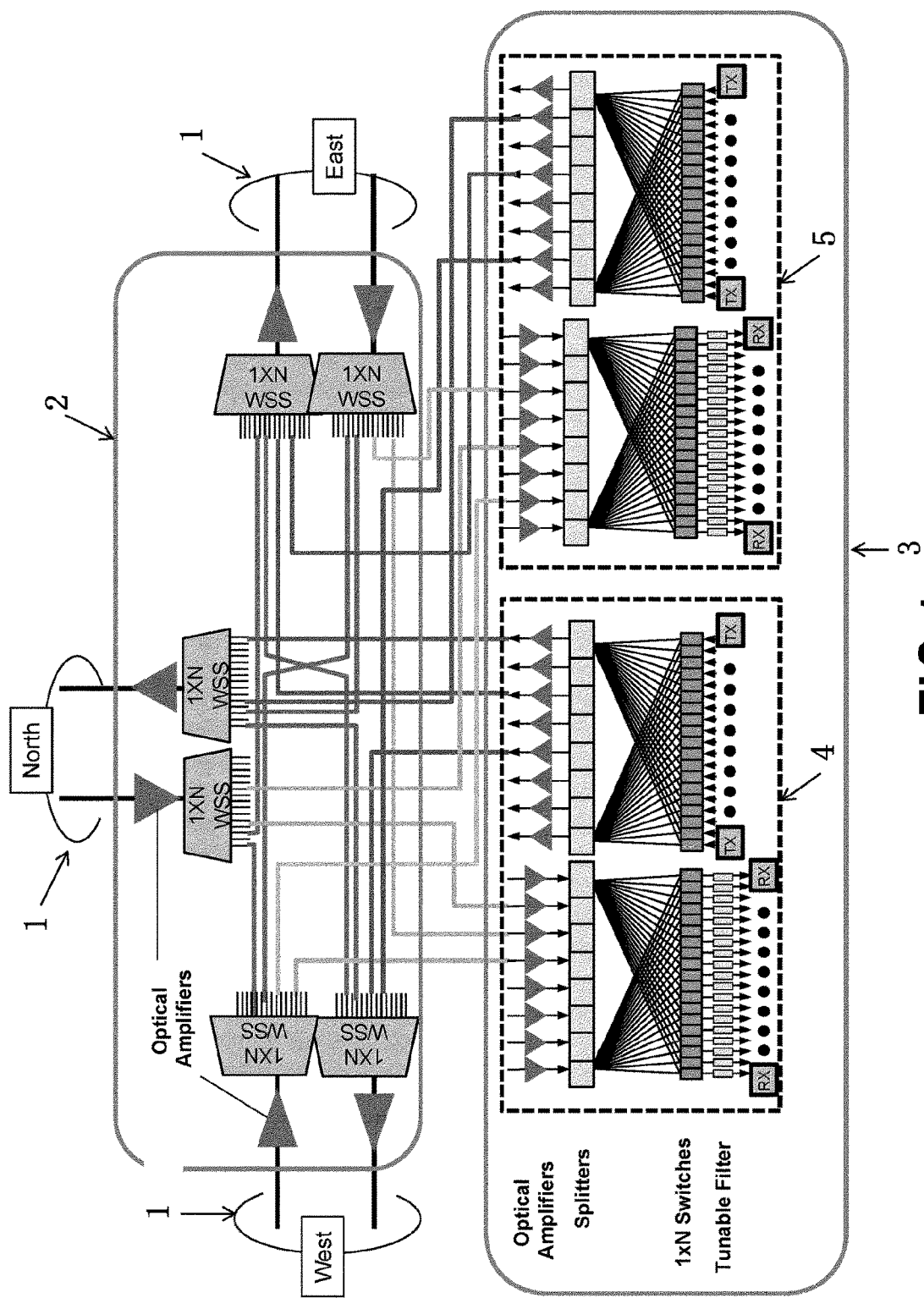
FIG. 1 illustrates one configuration example of a certain ROADM node device in a mesh network.
Figure 2:
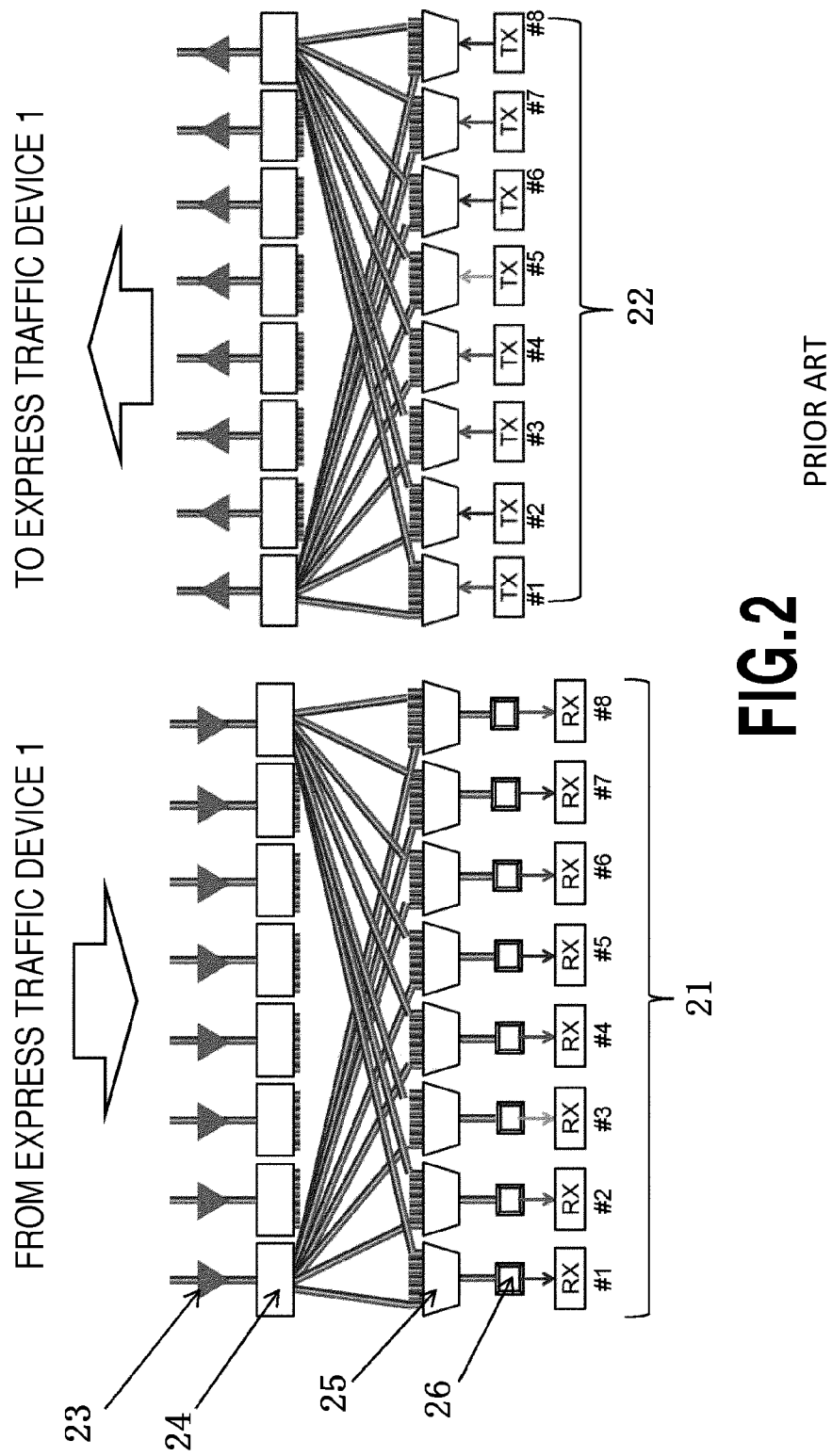
FIG. 2 illustrates an example of the configuration of an Add/Drop Traffic device.
Figure 3:
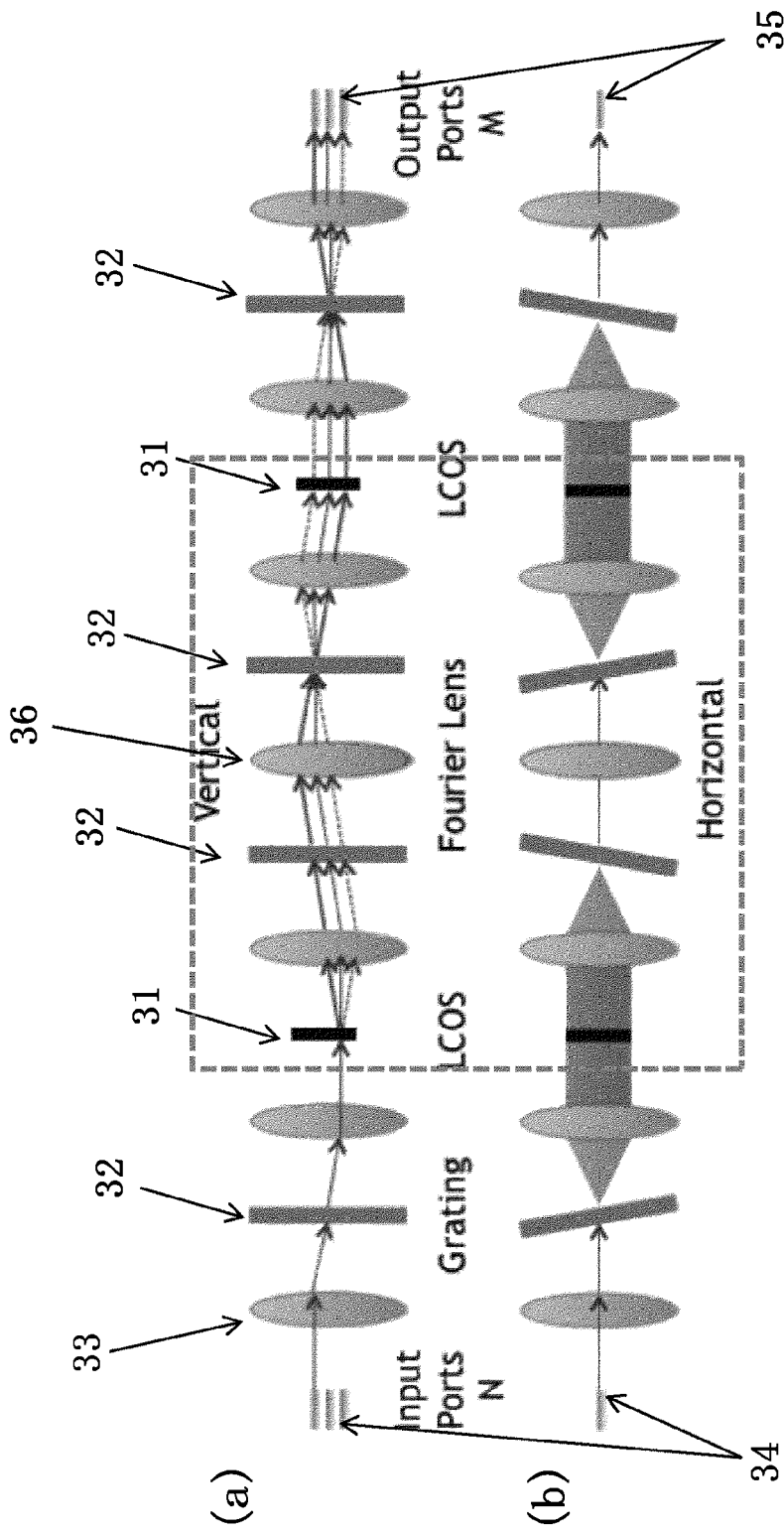
FIG. 3 illustrates a conventional N×M wavelength cross-connect (WXC) device.
Figure 4:
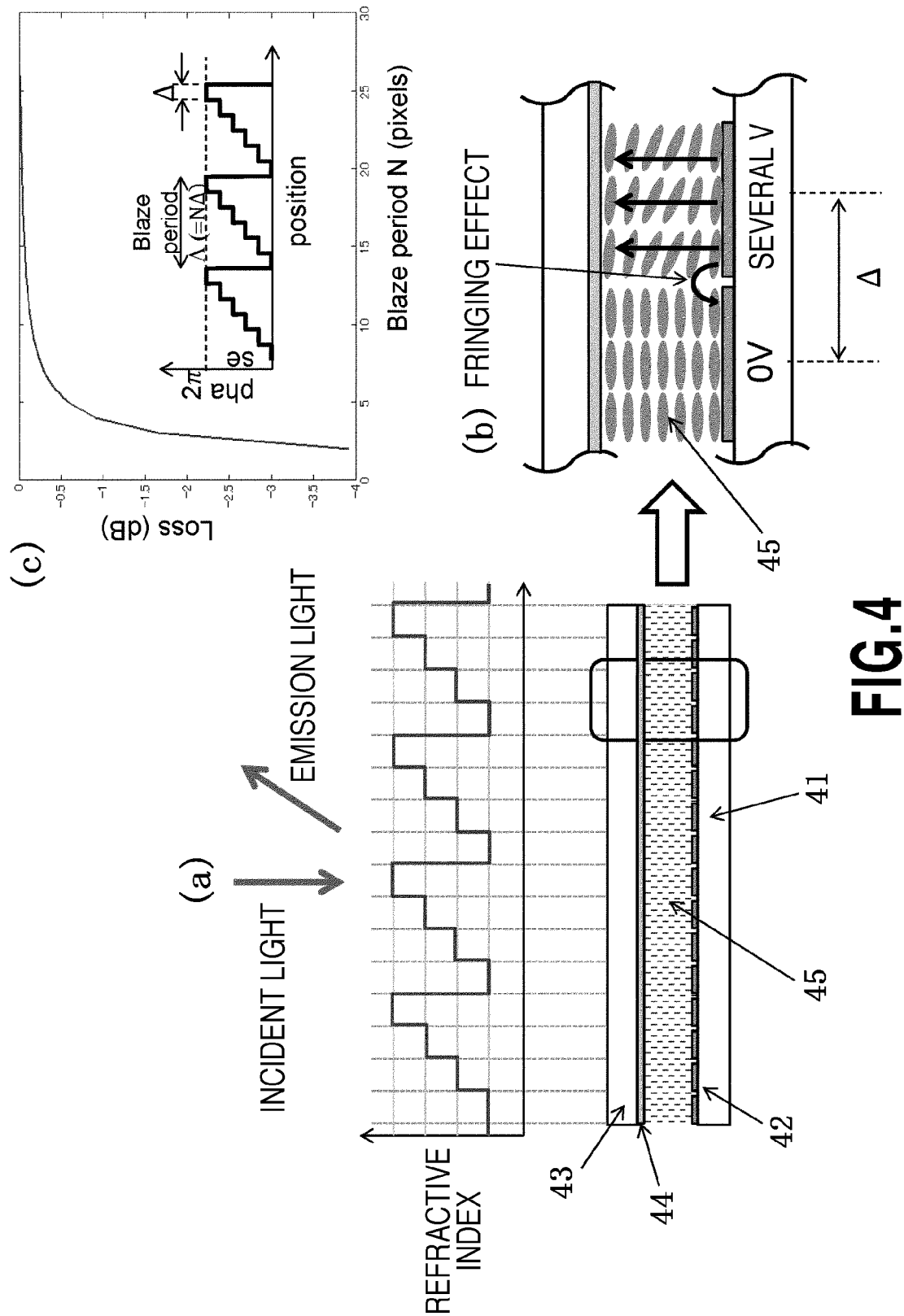
FIG. 4 illustrates a LCOS (Liquid Crystal On Silicon), which is used in an switching engine of the conventional N×M wavelength cross-connect device.
Figure 6:
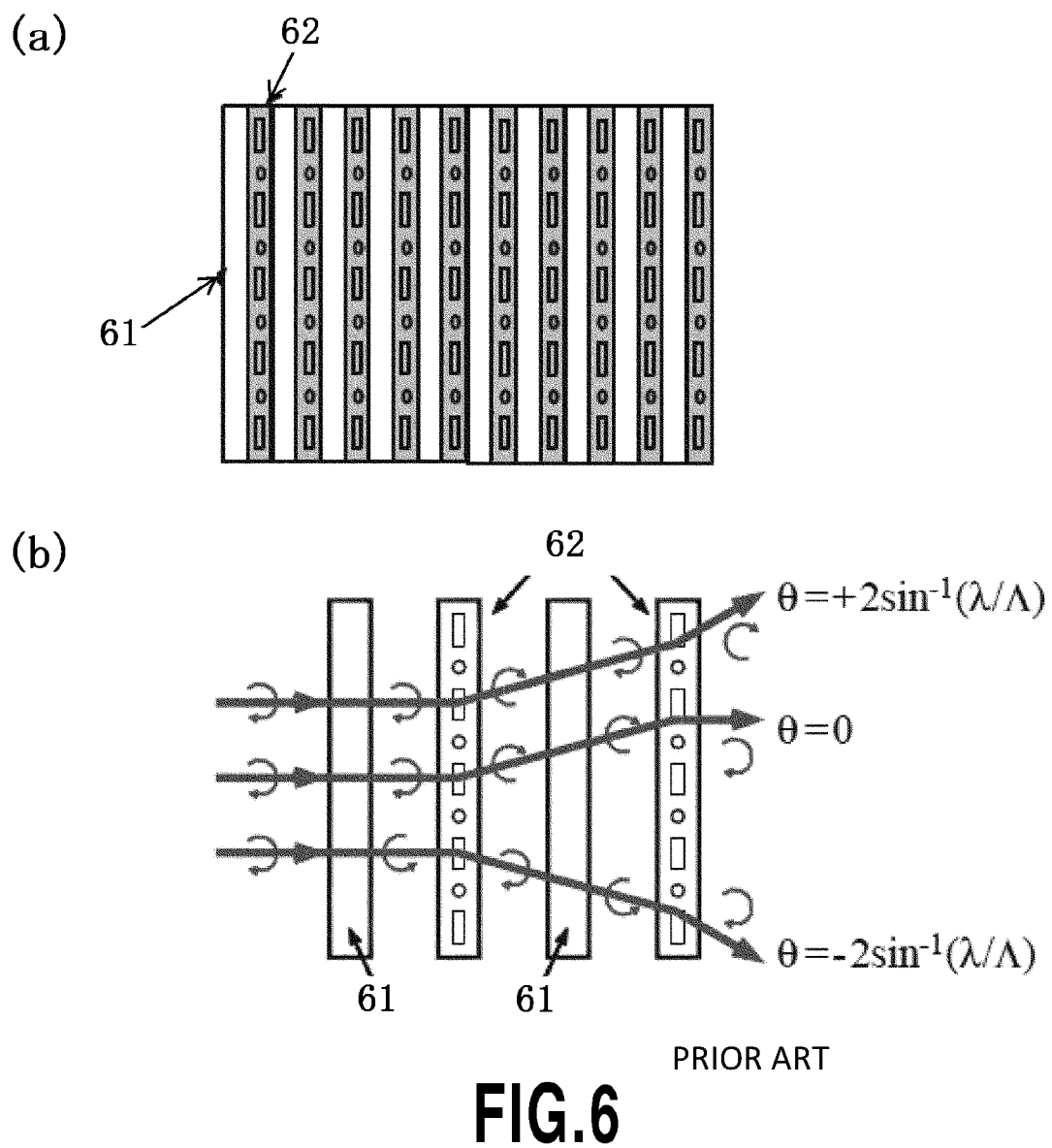
FIG. 6 illustrates a conventional steering element that allows a large deflection angle.
Figure 7:
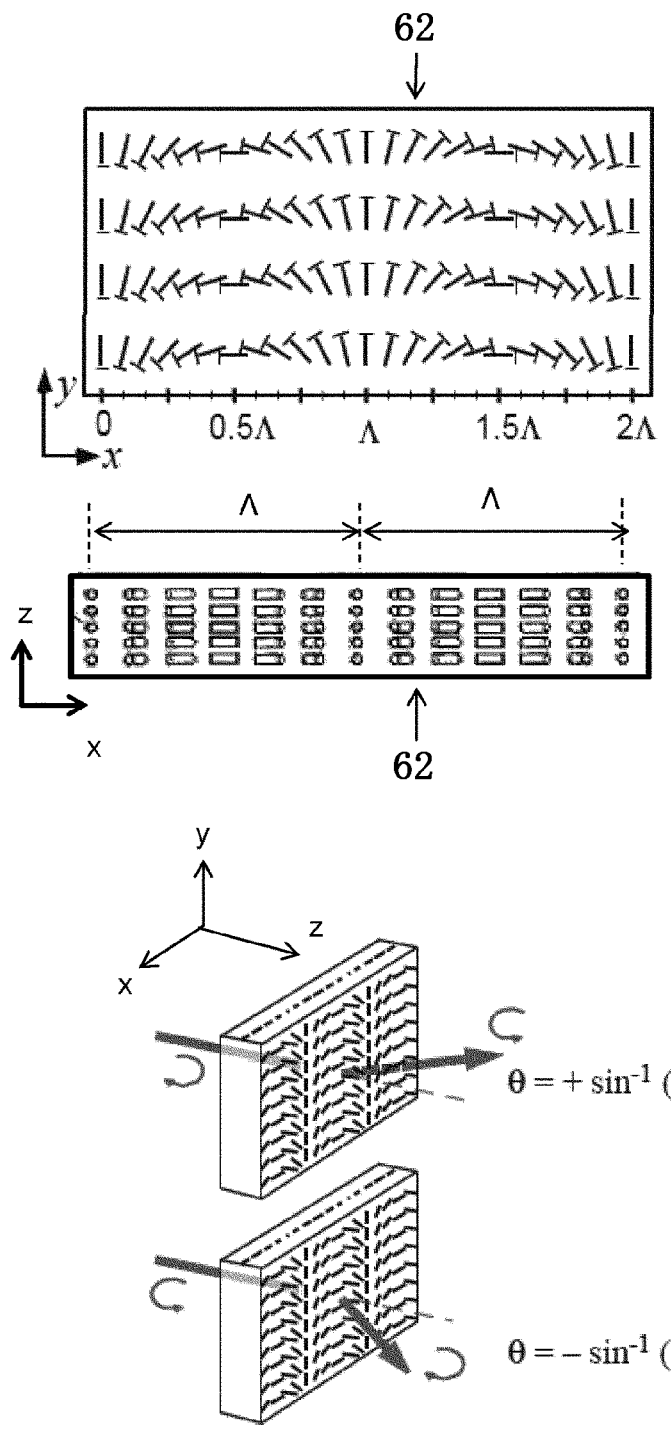
FIG. 7 is an explanatory view of a polarization grating that is used in the related art.
Figure 8:
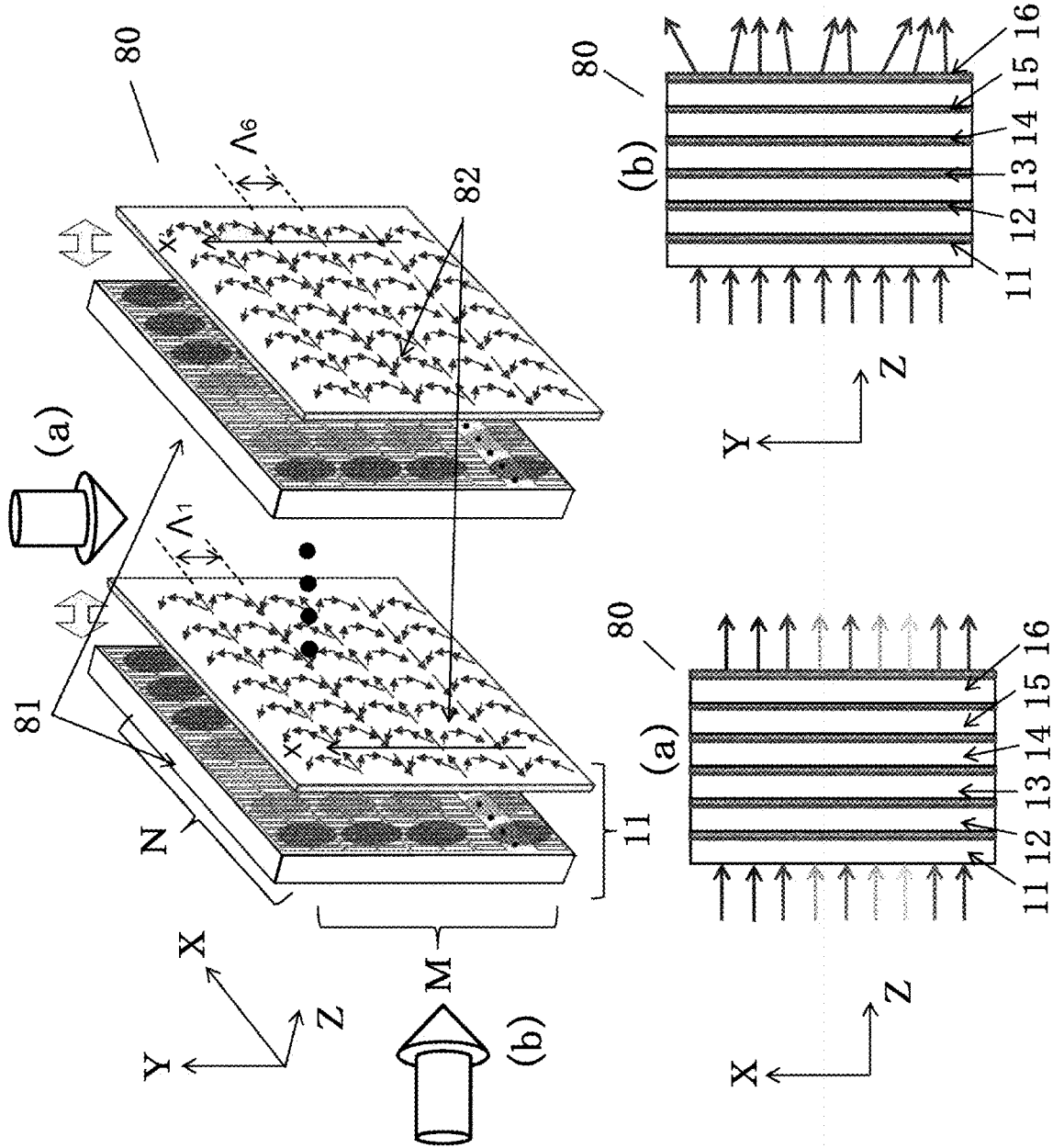
FIG. 8 is a view illustrating one embodiment of the present invention.

FIG. 8 illustrates one embodiment of a light beam deflecting element 80 of the present invention.

A switch element 1 (11)1 to a switch element 6 (16) are stacked, each having a basic structure of an N×M transmissive birefringence modulator 81, and a polarization grating 82 that is disposed or fitted to one side thereof.

The polarization grating 82 is disposed such that an X axis (or Y axis) that is a matrix direction of the N×M transmissive birefringence modulator 81 and a polarization rotation axis X' of the polarization grating 82 are in parallel.

Figure 9:
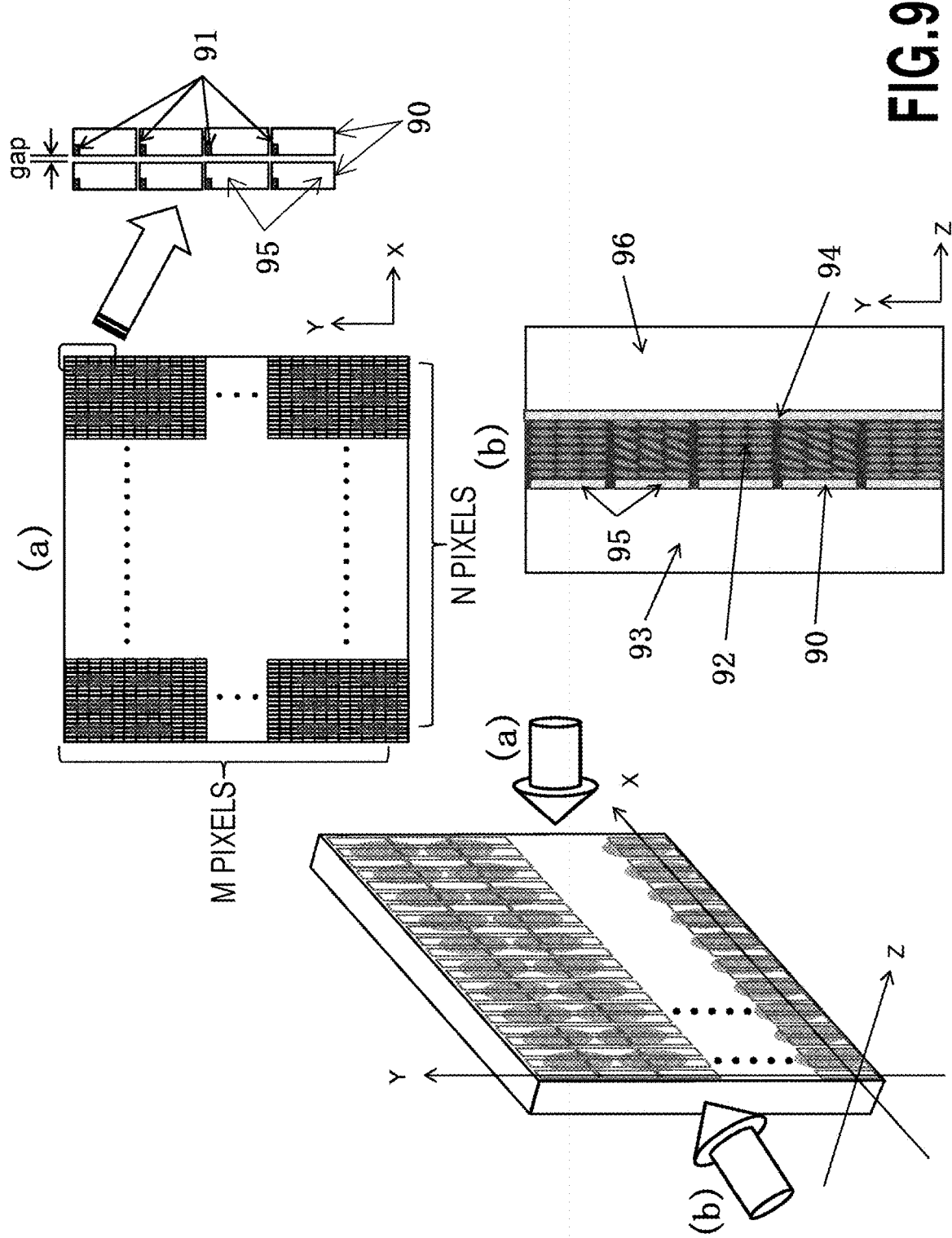
FIG. 9 illustrates an example of an N×M transmissive birefringence modulator that constitutes the one embodiment of the present invention.

FIG. 9 illustrates an example of an N×M transmissive birefringence modulator.

FIG. 9(a) is a front view, and FIG. 9(b) is a cross-sectional view.

This example indicates a case where N pixels and M pixels are respectively formed in the X axis direction and in the Y axis direction.

Each of pixels 90 includes a transparent electrode having a size of 8 μm×16 μm and a rectangular pattern, and a thin film transistor (TFT) 91 that is formed on a part thereof.

Moreover, each pixel is possible to have various sizes other than that in this example.

It should be noted that the pixel does not have to have a strictly rectangular shape but may have a substantially rectangular shape (or elliptic shape) to the extent that the shape can be formed in the producing process.

Meanwhile, when the light beam deflecting element 80 of the present invention is applied to a wavelength cross-connect device or an optical cross-connect device, a gap between the pixels may be desirably as small as possible for implementing a low loss and a low crosstalk.

The N×M transmissive birefringence modulator is structured such that the pixels 90 are formed on a silicon substrate 93, a silicon substrate on which a transparent electrode 94 is formed is disposed so as to be opposed to the silicon substrate 93, and liquid crystals 92 are inserted therebetween. It should be noted that an alignment layer is actually used to align the orientations of the liquid crystals 92, however, is not described here for simplicity.

The liquid crystals 92 can be made to function as an isotropy plate having no birefringence or a half-wavelength plate having a birefringence depending on the presence or absence of the power applied to the pixels 90.

As for the liquid crystals, nematic liquid crystals, blue layer liquid crystals, or the like can be used. It should be noted that when linear polarization is incident at an incident end, the liquid crystals 92 are caused to operate as a quarter wavelength plate so as to obtain left or right circular polarization in some cases.

In addition, in order to reduce the Fresnel reflection due to a difference in the refractive index between each pixel 90 and the transparent electrode 94, and the liquid crystals 92, a nonreflective coating may be formed between these. Moreover, in order to reduce the Fresnel reflection due to a difference in the refractive index between each pixel 90 and the silicon substrate 93, or the transparent electrode 94 and a silicon substrate 96, a nonreflective coating may be formed between these.

In this example, although Si (n=3.5) having a large refractive index is used for the substrate material, Ge (n=4.2) may be also used.

Figure 10:
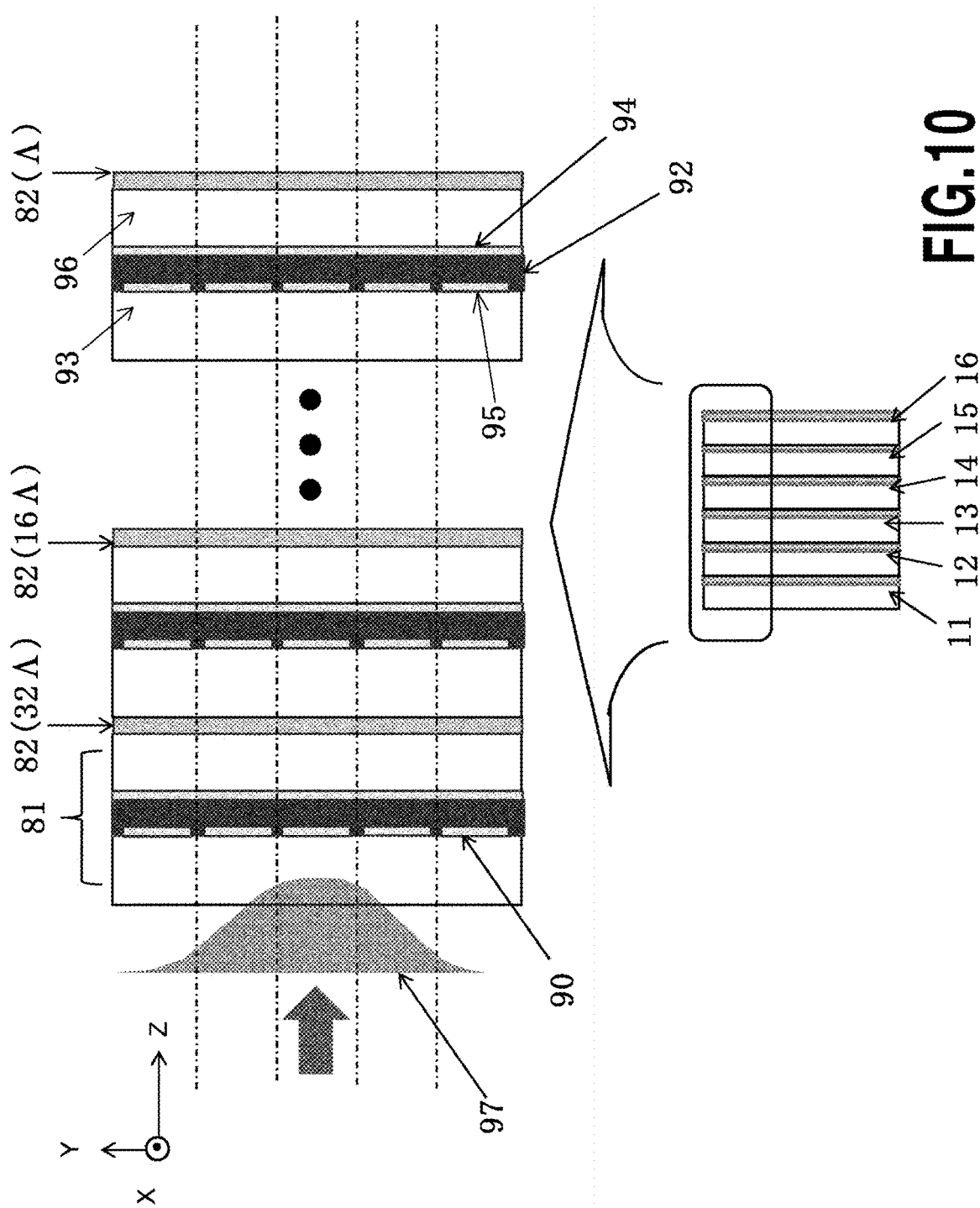
FIG. 10 is an explanatory view of a stacking method of a deflection beam element in the present invention.

When the switch elements are stacked, as illustrated in FIG. 10, the pixels 90 of the N×M transmissive birefringence modulators 81 are stacked so as to coincide with each other when viewed in the propagation direction of a light beam 97.

Moreover, in this case, approximately five pixels 90 forming a group in the Y direction cause one light beam to deflect.

This can flexibly cope with the change in the spot size of each incident light beam that changes in accordance with the usage purpose, by changing the grouping of the pixels 90.

Moreover, although a case where the stacked polarization gratings 82 are stacked such that periods $\wedge$ thereof have the order from the large period to the small period with respect to the propagation direction of light, that is, $32\wedge$, $16\wedge$, $8\wedge$, $4\wedge$, $2\wedge$, $\wedge$, is indicated, the order may be changed.

Moreover, nonreflective coating may be applied between each of the N×M transmissive birefringence modulators 81 and each of the polarization gratings 82 constituting the light beam deflecting element 80 of the present invention, and the air with input and output sections, in order to reduce the Fresnel reflection due to a difference in the refractive index.

In addition. In this embodiment, a switching state in which the light is incident at a large deflection angle is generated in the light beam deflecting element 80 having the $\wedge$ period through which the light passes lastly.

When the light is incident at a large deflection angle, the light obliquely passes through the liquid crystals 92 constituting the N×M transmissive birefringence modulator 81, which results in the elliptic polarization deviated from the perfect circular polarization, compared with a case where the deflection angle is small.

In order to correct this deviation, a phase correction plate may be inserted between the N×M transmissive birefringence modulator 81 and the polarization grating 82.

It should be noted that although the case where the six switch elements 11 to 16 in which polarization gratings of six types having $32\wedge$, $16\wedge$, $8\wedge$, $4\wedge$, $2\wedge$, and $\wedge$ are respectively used as the periods of the polarization gratings 82 are stacked is illustrated in this example, any number of switch elements may be used in accordance with the desired purpose.

Referring back again to FIG. 8, a case where the light beam deflecting element 80 of the present invention is used to a wavelength cross-connect device is exemplified, and an operation thereof will be described.

FIG. 8(a) illustrates the operation when seen from the upper surface, in which light beams having wavelengths different in the X direction are incident, and do not deflect in the X direction.

In contrast, as illustrated in FIG. 8(b) that is the operation seen from the side surface, light beams having the same wavelength in the Y direction independently deflect in the up-and-down direction.

Although only the operation of light beams having a given wavelength is illustrated herein, light beams having other wavelengths deflect independently in the up-and-down direction in the similar manner.

Figure 11:
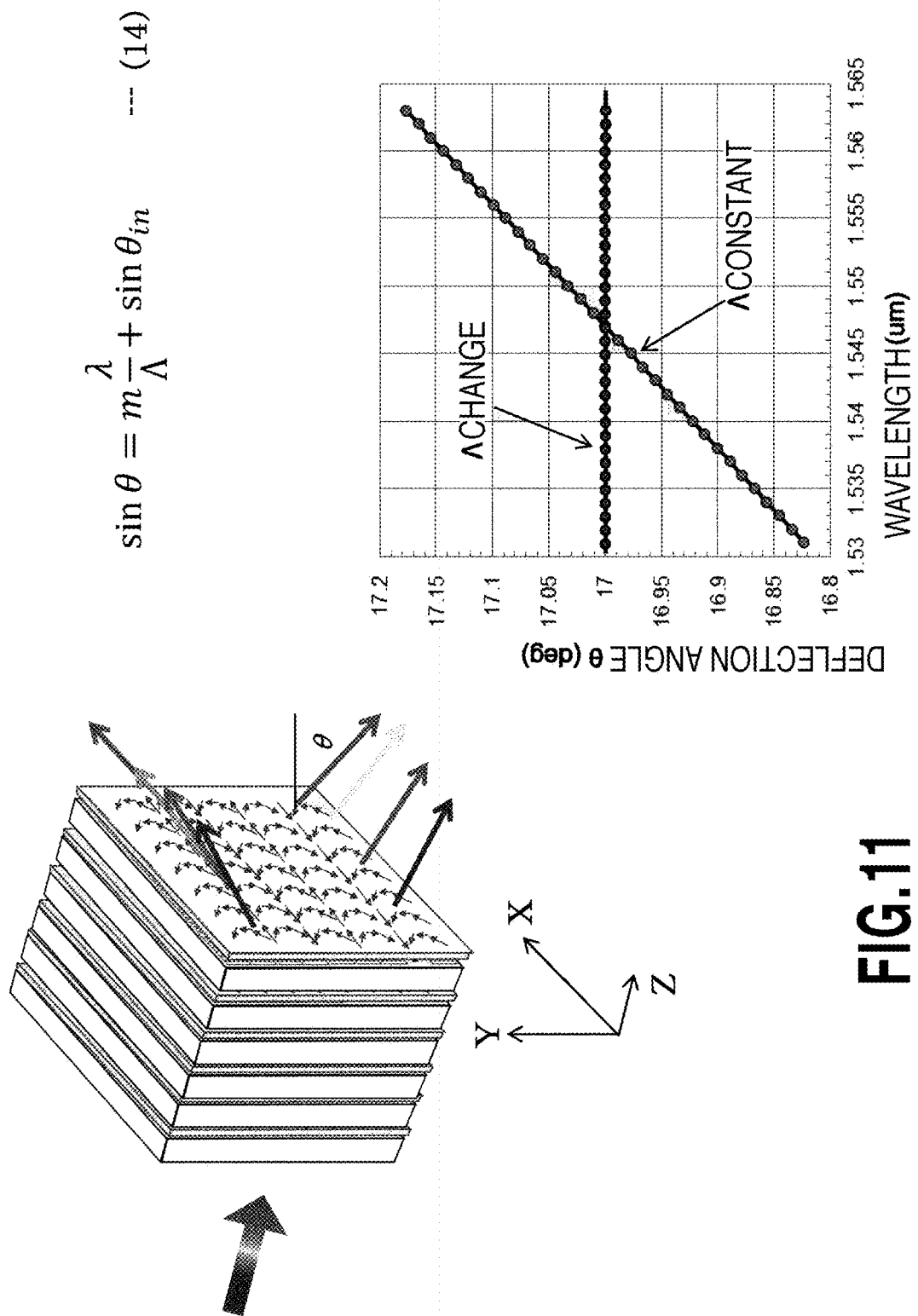
FIG. 11 is an explanation view of a chirped polarization grating and a deflection beam element, which are important when the deflection beam element of the present invention is used to a wavelength cross-connect device.

As illustrated in Equation (6) described in the foregoing, the deflection angle θ is the function of the wavelength, thus, in a case where light beams having wavelengths different from one another are caused to be incident (in an WDM optical communication called C-band, the wavelengths from about 1530 nm to 1570 nm are used) such as the wavelength cross-connect device, as illustrated in FIG. 11, the deflection angle θ differs depending on the wavelength, and the large loss is generated in the wavelength in the vicinity of the edge in the C-band.

Accordingly, in the present patent, so as to prevent the wavelength from changing in accordance with the deflection angle θ, the period ∧ of the grating is caused to gradually change by several percent in the X direction (chirped period ∧).

This allows the constant deflection angle θ even if the wavelength changes, which can cope with the practical system.

Figure 12:
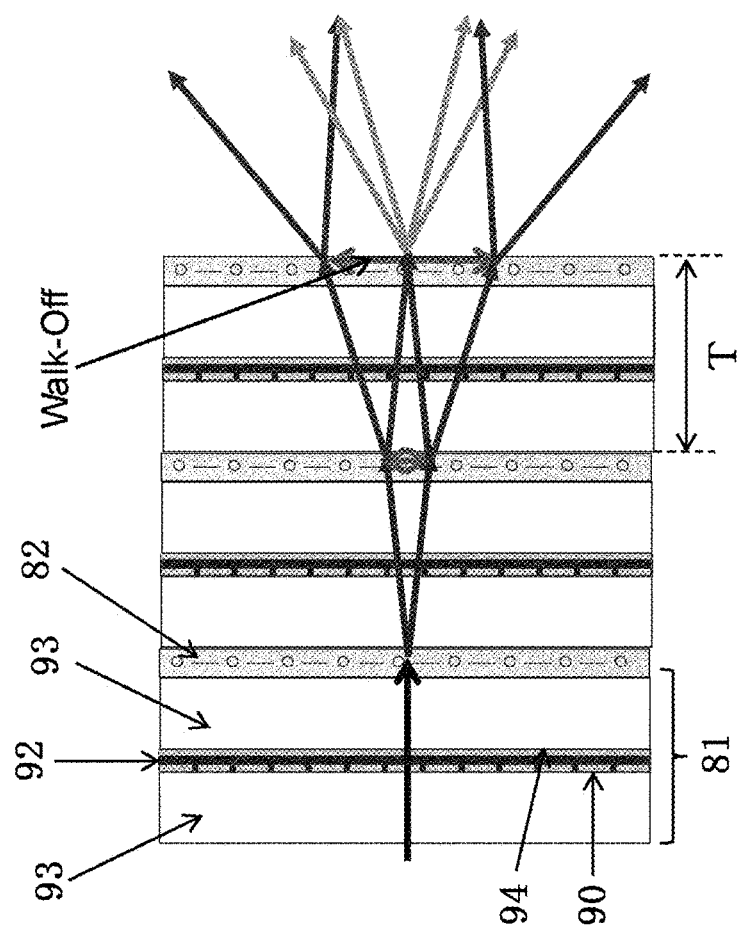
FIG. 12 is an explanation view of walk-off, which becomes one of problems when a stacked type switching engine as the present invention is used to a wavelength cross-connect device (or an optical cross-connect device)

FIG. 12 is an explanation view of walk-off, which becomes one of problems when the light beam deflecting element 80 of the stacked type as the present invention is used to a wavelength cross-connect device (or an optical cross-connect device).

FIG. 12(a) illustrates a case where three stages of switch elements are stacked. Meanwhile, FIG. 12(b) illustrates the ideal deflection of the light beam. The ideal deflection of the light beam is deflected centering on the same starting point.

However, actually, as illustrated in FIG. 12(a), light beams emitted from the last element in the stacked light beam deflecting element are dispersed and deflect from different positions. The distance between the dispersed beams is defined as walk-off.

The worst value of this walk-off is given by the following Equation.

[Equation 7]

$$\text{Walk-off} = \frac{2T}{2}(\tan\theta 1 + \tan\theta 2 + \ldots \tan\theta p) \quad (7)$$

Here, T indicates the thickness of each of the N×M transmissive birefringence modulators 81 and each of the passive polarization gratings 82, θi indicates the deflection angle (half-angle) of each element of the switching engine (i is a stacked number), and n indicates the refractive index of the substrate constituting the N×M transmissive birefringence modulator 81.

In the present invention, the polarization grating 82 has a thickness of several micrometers, and is directly bonded to the substrate constituting the N×M transmissive birefringence modulator 81.

Therefore, the actual T may be regarded as the thickness of the N×M transmissive birefringence modulator 81.

In addition, the thicknesses of the pixels 90 and the transparent electrode 94 formed on the N×M transmissive birefringence modulator 81, and the thickness of the liquid crystals 92 are thinner than the thickness of the substrates 93 constituting the N×M transmissive birefringence modulator 81, thus, T is substantially decided based on the thickness of the two substrates constituting the N×M transmissive birefringence modulator 81.

From Equation (7), T/n may be made small in order to make the walk-off small.

Although a case where the substrate material is glass is indicated as an example in the related art, by considering that the substrate is applied to multi-port wavelength cross-connect or optical cross-connect devices of about 64×64, T, that is the thickness of the two substrates, is necessary to be thinned to approximately 200 μm for implementing the practical loss (the loss exponentially increases with respect to the walk-off).

The thin substrate of 100 μm has a very weak strength and is difficult to be dealt with in the producing process, and the substrate after having been produced is required to be polished.

Accordingly, the case is difficult to implement in terms of the production and the price.

Therefore, in the present patent, Si (n=3.5) and Ge (n=4.2) having a large refractive index are used as materials.

These materials are transparent in the 1.55 μm band that is used in the optical communication, and can implement the switching engine with the small walk-off and the low loss even if T is in approximately 600 μm.

It should be noted that the commercially available Si substrates are commercially available of about 300 μm or more, which cause no problem in terms of both the strength and the price.

The Si substrate with the thickness of 1 mm or lower can practically implement the switching engine with the small walk-off and the low loss.

Embodiment 2

Figure 13:
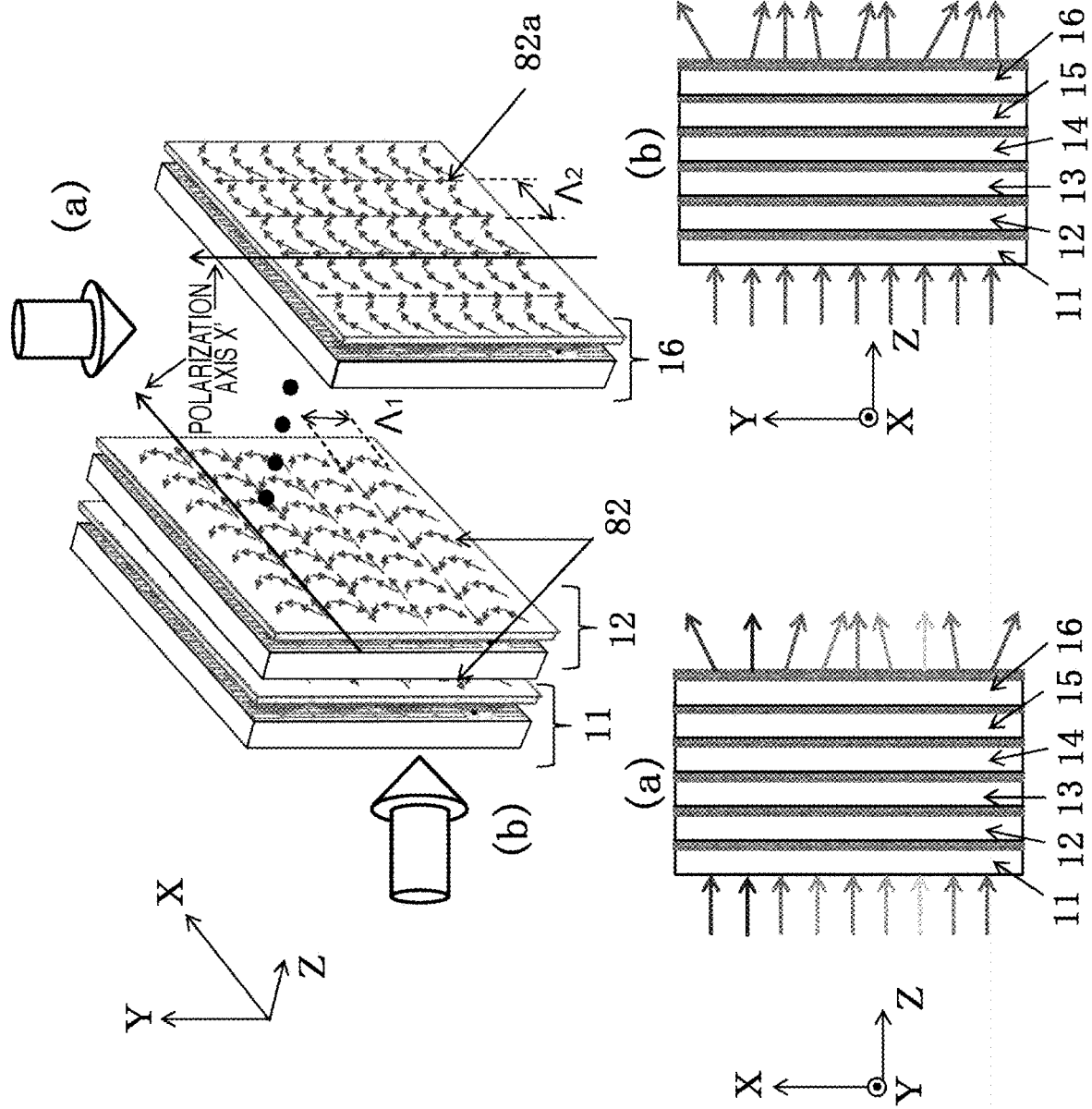
FIG. 13 illustrates another embodiment of the deflection beam element of the present invention.

FIG. 13 illustrates another embodiment of the present invention.

In the present invention, a polarization axis X' of a polarization grating 82a constituting the stacked last switch element 16 is rotated by 90°, and is made to be orthogonal with respect to the polarization gratings 82 of the other switch elements 11 to 15.

FIG. 13(a) and FIG. 13(b) are respectively a top view and a side view. The polarization axis X' is made to be orthogonal with respect to the polarization gratings 82 to allow the deflection also in the X-Z plane in addition to the deflection only in the Y-Z plane before, thereby making it possible to drive the two-dimensional deflection.

Figure 14:
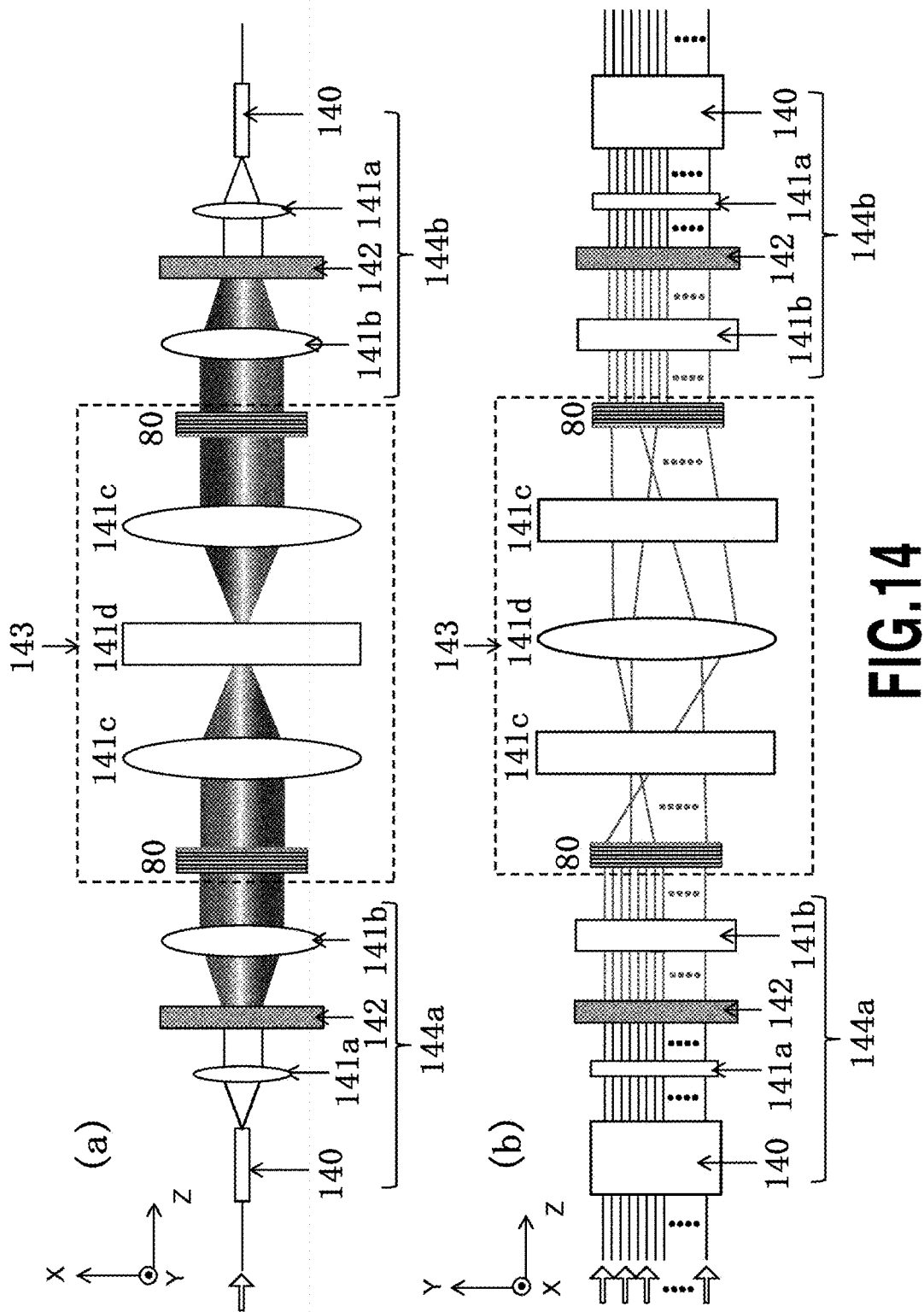
FIG. 14 illustrates an example of a wavelength cross-connect device in which the light beam deflecting element of the present invention is used.

FIG. 14 illustrates an example of a wavelength cross-connect device in which the light beam deflecting element of the present invention is used.

FIG. 14(a) is a top view (X-Z plane), and illustrates the plane on which the light is dispersed. Meanwhile, FIG. 14(b) is a side view (Y-Z plane), and illustrates the plane on which light having each wavelength is switched.

This wavelength cross-connect device includes an input section 144a, an output section 144b, and a wavelength cross-connect section 143, that is a portion surrounded by the dashed line.

The optical system is a symmetrical optical system centering on a cylindrical lens A (141d).

For convenience, although the input section 144a and the output section 144b are divided, interchanging them causes no problem.

The wavelength cross-connect section 143 is the core of an operation, and is configured such that: the two same light beam deflecting elements 80 described in the present patent are used so as to be opposed to each other; in the substantial middle point between the light beam deflecting elements 80, a curved surface (power surface, in other words, a plane on which the light is refracted)) of the cylindrical lens A (141d) having a focal length F is disposed in parallel with the switching plane; and two cylindrical lenses B (141C) each having a focal length F' are each disposed in the middle point between the cylindrical lens A (141d) and either the two light beam deflecting elements 80 such that the curved surface of the cylindrical lens A and the curved surface of the cylindrical lens B are orthogonal to each other, and the relation of the abovementioned Equation (8) is established between the focal length F and the focal length F', in the wavelength cross-connect section 143.

This optical system allows different operations in the plane on which the light is dispersed in FIG. 14(a) and the plane on which the light having each wavelength is switched in FIG. 14(b). In other words, the optical system becomes the optical system of 4F' on the plane on which the light is dispersed in FIG. 14(a), does not perform an active operation such as switching, but reproduces an image of the light beam deflecting element 80 on the light beam deflecting element 80 at the output side although the image is inversed.

In contrast, the optical system becomes the Fourier optical system of 2F on the plane on which the light having each wavelength is switched in FIG. 14(b), and converts the angle to the position and the position to the angle, in the light beam.

The light beam deflecting element 80 at the input side converts the angle to allow the position of the light beam to be incident into the opposed light beam deflecting element 80 at the output side to be changed.

The light beam deflecting element 80 at the output side makes the light beam having been incident inclined be parallel in the Z direction, and propagate the light beam to an output unit 142b.

Next, the input section 144a and the output section 144b will be described.

Herein, for easy understanding, the optical system through which the light passes will be described, gratings 142 actually used allow the inclined incidence and the inclined emission, and thus are disposed in accordance with them.

The input section 144a and the output section 144b have the same structure, and are disposed to be opposed to each other by sandwiching the wavelength cross-connect optical system 143 therebetween.

Although various methods for constituting the input section 144a and the output section 144b can be considered, an example is indicated herein, each of the input section 144a and the output section 144b includes a collimator attached fiber array 140, a cylindrical lens 141a, the grating 142, and a cylindrical lens 141b.

The important point is that the grating 142 is disposed such that the ruling thereof is vertical with respect to the paper surface on the plane on which the light is dispersed in FIG. 14(a), thus, the light diffracts for every wavelength.

Therefore, the light diffracted using the cylindrical lens 141b is made to parallel light, and thereafter is caused to be incident into the wavelength cross-connect section 143.

The spot size of the light beam to be incident into the grating 142 is controlled using the collimator attached fiber array 140 and the cylindrical lens 141a in accordance with the necessary wavelength resolution.

Meanwhile, on the plane on which the light having each wavelength is switched in FIG. 14(b), the ruling of the grating 142 is in parallel with respect to the paper surface, thus, the light does not diffract, and the light beam from the collimator attached fiber array 140 travels straight ahead, and is incident into the wavelength cross-connect section 143.

When the spot size of the light beam caused to be incident into the wavelength cross-connect section 143 is intended to be controlled, another cylindrical lens may be inserted between the collimator attached fiber array 140 and the grating 142.

Several or several tens of pixels out of many pixels are grouped using the light beam deflecting element of the present invention to allow one virtual deflection plane to be formed, which can correspond to beams of the various numbers of wavelengths and the various numbers of ports, thereby obtaining the universal light beam deflecting element.

Moreover, the large polarization angle allows the multiport N×N wavelength cross-connect device to be implemented, thereby allowing the significantly downsizing, the low cost, and the simplification of the conventional ROADM node device.

Embodiment 3

Figure 15:
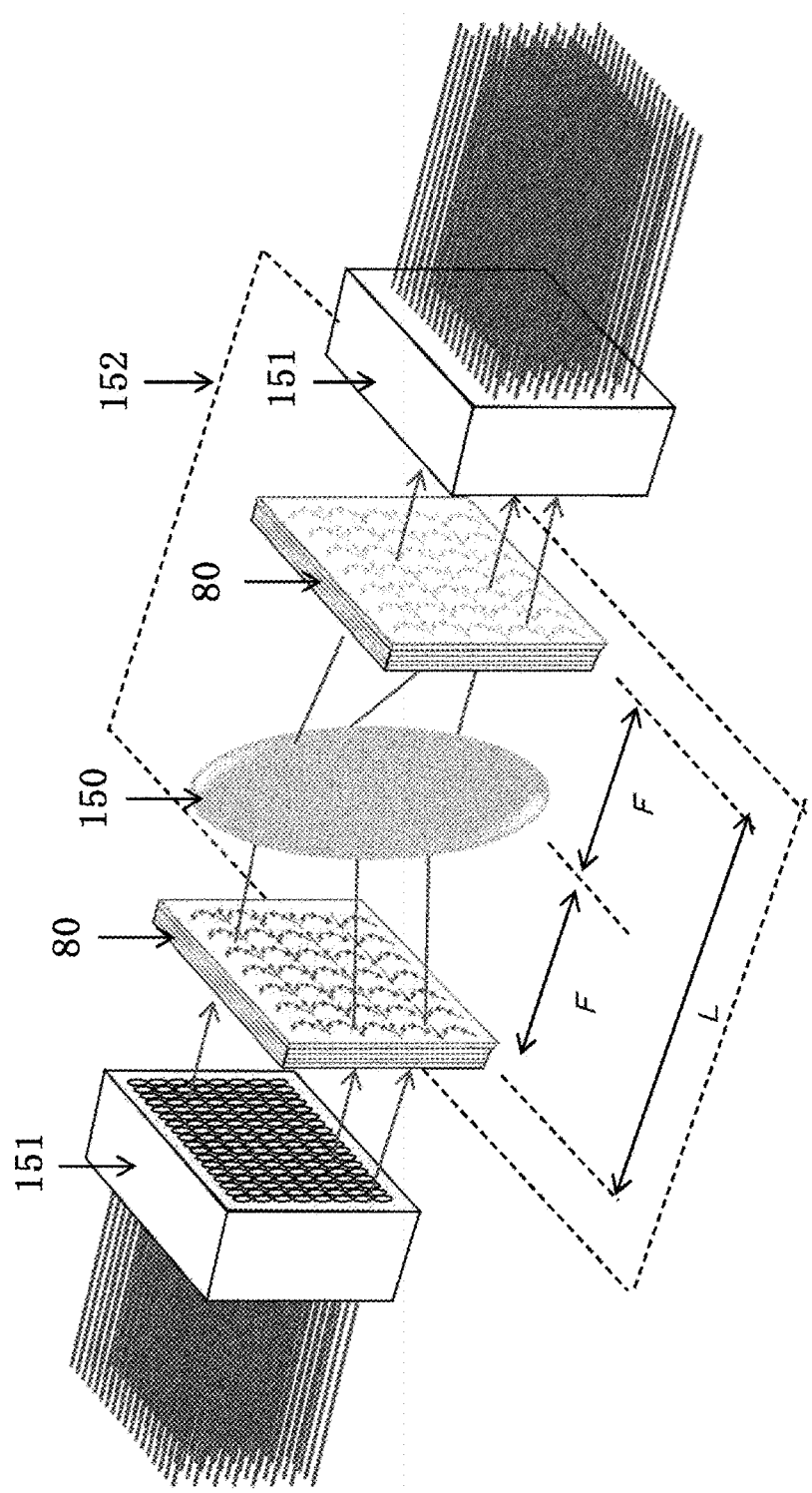
FIG. 15 illustrates an example of an optical cross-connect device in which the light beam deflecting element of the present invention is used.

FIG. 15 illustrates an example of an optical cross-connect device in which the light beam deflecting element of the present invention is used.

The optical cross-connect device includes input and output collimator attached two-dimensional fiber arrays 151, the light beam deflecting elements 80, and a Fourier lens 150 having a focal length F.

The light beam deflecting element 80 in the present embodiment is the light beam deflecting element 80 illustrated in FIG. 13 that allows the two-dimensional deflection drive.

An optical system in which the same two light beam deflecting elements 80 are disposed to opposed to each other with an interval L and the Fourier lens 150 having a focal length F is disposed in the approximately middle point between the light beam deflecting elements 80 is a cross-connect optical system characterized in that the relation of the abovementioned Equation (9) is established.

The optical system is a Fourier optical system, thus, the angle is converted into the position, and the position is converted into the angle.

The light beam deflecting element 80 at the input side converts the angle to allow the position of the light beam to be applied to the opposed light beam deflecting element 80 at the output side to be changed.

Several or several tens of pixels out of many pixels are grouped using the light beam deflecting element of the present invention to allow one virtual deflection plane to be formed, which can correspond to beams of the various numbers of wavelengths and the various numbers of ports, thereby obtaining the universal light beam deflecting element.

Moreover, the large polarization angle allows the multiport optical cross-connect device to be implemented, thereby allowing the significantly downsizing, the low cost, and the simplification of the conventional ROADM node device.

Embodiment 4

Figure 16:
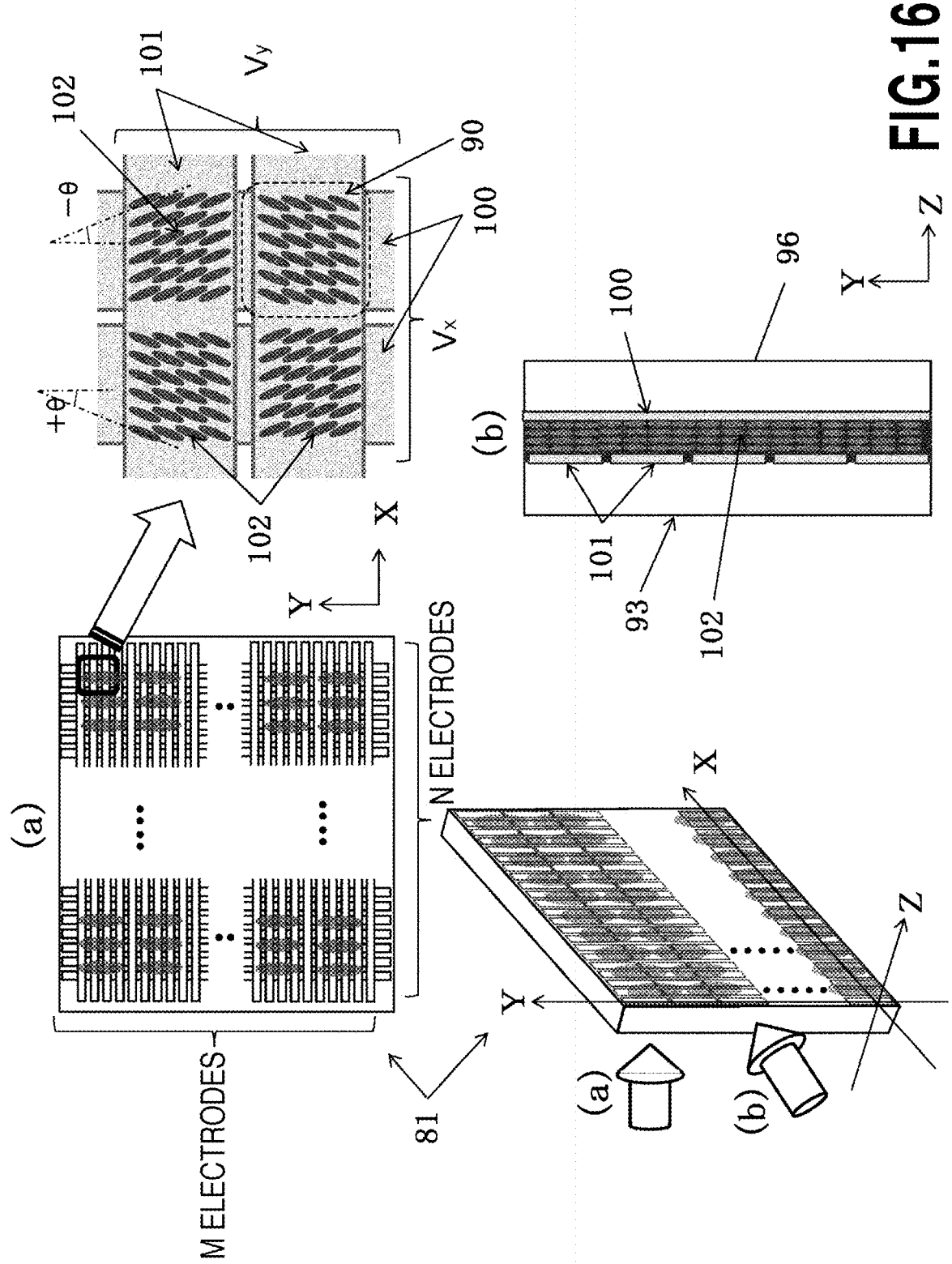
FIG. 16 illustrates an example of another form of an N×M transmissive birefringence modulator that constitutes the one embodiment of the present invention.

FIG. 16 illustrates another embodiment of the N×M transmissive birefringence modulator 81.

FIG. 16(a) is a front view, and FIG. 16(b) is a cross-sectional view.

This example indicates a case where instead of the N×M transmissive birefringence modulator 81 of the active type constituting light beam deflecting element 11 in the Embodiment 1, an N×M transmissive birefringence modulator 81 having a passive matrix and two quarter wavelength films 111 that sandwich the N×M transmissive birefringence modulator 81 therebetween are used.

Two silicon substrate 93 and silicon substrate 96 each include N line-shaped electrodes 101 in the X axis direction and M line-shaped electrodes 100 in the Y axis direction, and ferroelectric liquid crystals 102 are inserted therebetween.

A portion where the electrode 101 and the electrode 100 intersect each other is operated as each pixel 90.

The ferroelectric liquid crystal 102 has a memory property, thus, can operate with simple pairs of two of the electrode 101 and the electrode 100, whereas the TFT (Thin Film Transistor) 91 is not necessary, compared with the example illustrated in FIG. 9.

For example, when the voltage of Vx=+5 (V) is applied to one of the electrodes 101 and the voltage of Vy=−5 (V) is applied to one of the electrodes 100, in a pixel 90 where the electrodes are crossed, a director of the liquid crystal is inclined by an angle +θ in the X, Y plane, and holds the state when the voltage becomes 0 (V) thereafter (defined as +State).

In contrast, in another pixel 90 where the electrodes are crossed, when the reversed voltages Vx=−5 (V) and Vy=+5 (V) are applied, the director of the liquid crystal is inclined by an angle −θ in the X, Y plane and holds the state (defined as −State).

In this manner, the voltage is applied to only pixel 90 required to be changed to change the direction of the electric field to be applied to the liquid crystal, thereby allowing the direction of the director of the liquid crystal to be controlled such as +State and −State.

Moreover, the director of the liquid crystal can cause the liquid crystal have a latching function by keeping the non-voltage 0 (V) in a normal state.

Since the director of the liquid crystal is birefringent, the ferroelectric liquid crystal 102 can be made to act as a half-wavelength plate with the thickness of the liquid crystal adjusted appropriately.

Moreover, as described in the following, the ferroelectric liquid crystals 102 with θ of 22.5° and the quarter wavelength films 111 are used to make it possible to control the rotation direction of the circular polarization to be emitted based on the states (+State and −State) of the applied voltage to each pixel 90.

The explanation will be described using FIG. 17 and FIG. 18.

Figure 17:
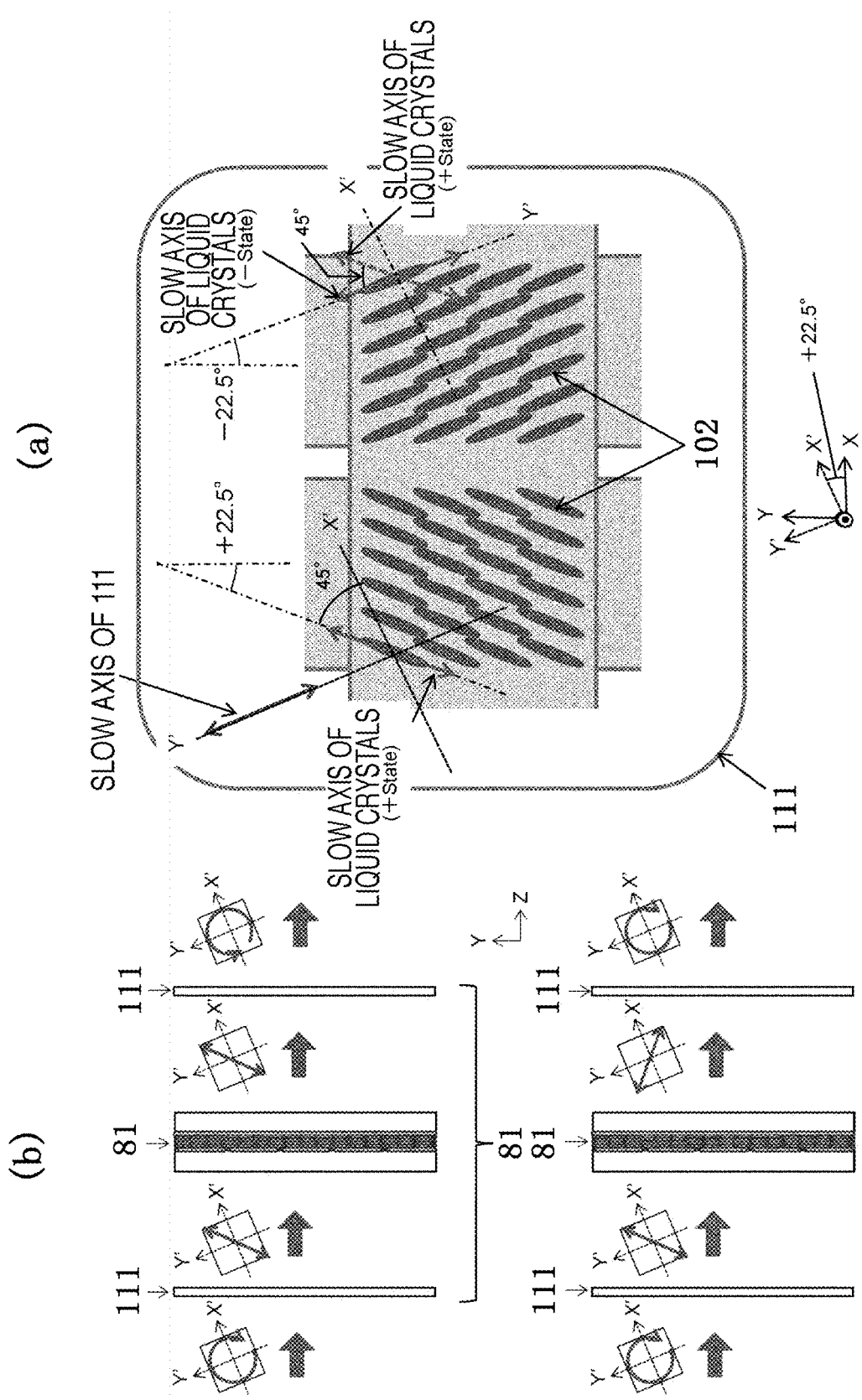
FIG. 17 is an explanation view in a case where incident circular polarization is right-handed circular polarization, as an operation of another form of the N×M transmissive birefringence modulator that constitutes the one embodiment of the present invention.

Firstly, a case where right-handed circular polarization is incident into the quarter wavelength films 111 is considered using FIG. 17.

FIG. 17(a) illustrates a front view, and FIG. 17(b) illustrates a side view.

Herein, a case where in the N×M transmissive birefringence modulator 81 in the states (+State and −State) of the applied voltage, a Slow axis (Fast axis) of the liquid crystal is inclined at θ=±22.5 is considered.

Moreover, a case where a retardation (phase difference) between the Slow axis and a Fast axis is n, in other words, the N×M transmissive birefringence modulator 81 is operated as a half-wavelength plate is considered.

The applied voltage is controlled so as to be in a state of +State (Vx=+5 (V) and Vy=−5 (V)).

When the Slow axis of the quarter wavelength film 111 is disposed being inclined at 22.5° from the coordinates Y axis, the angle with the Slow axis (in a case of +State) of the liquid crystal becomes 45°.

Herein, for convenience, the coordinates system (X' and Y') is considered changing from the coordinates system (X and Y).

A Jones matrix in the coordinates system (X' and Y') of the quarter wavelength film 111 is given by Equation (10).

[Equation 10]

$$\begin{bmatrix} 1 & 0 \\ 0 & i \end{bmatrix} \quad (10)$$

The polarization to be outputted becomes linear polarization that oscillates at an angle of 45° from the X' axis in the first quadrant and the third quadrant of the coordinates system (X' and Y'), as Equation (11).

[Equation 11]

$$\frac{1}{\sqrt{2}}\begin{bmatrix} 1 & 0 \\ 0 & i \end{bmatrix}\begin{bmatrix} 1 \\ -i \end{bmatrix} = \frac{1}{\sqrt{2}}\begin{bmatrix} 1 \\ 1 \end{bmatrix} \quad (11)$$

Herein, the state of +State is considered, thus, the Slow axis of the director of the liquid crystal of the N×M transmissive birefringence modulator 81 is inclined at 45° from the X' axis.

Therefore, the Slow axis matches the direction of incident linear polarization, so that the linear polarization is stored, and is emitted from the N×M transmissive birefringence modulator 81.

Thereafter, the linear polarization is incident into the quarter wavelength film 111, and is converted into left-handed circular polarization as in Equation (12).

[Equation 12]

$$\frac{1}{\sqrt{2}}\begin{bmatrix} 1 & 0 \\ 0 & i \end{bmatrix}\begin{bmatrix} 1 \\ 1 \end{bmatrix} = \frac{1}{\sqrt{2}}\begin{bmatrix} 1 \\ i \end{bmatrix} \quad (12)$$

Next, the applied voltage is controlled so as to be in a state of −State ((Vx=−5 (V) and Vy=+5 (V)). The discussion before polarization is incident into the N×M transmissive birefringence modulator 81 is the same as the abovementioned discussion, thus, polarization incident into the N×M transmissive birefringence modulator 81 is linear polarization that oscillates at an angle of 45° from the X' axis.

Because the state is −State, the Slow axis of the director of the liquid crystal of the N×M transmissive birefringence modulator 81 is changed at 45° from the +State, in other words, in parallel with the Y' axis. The ferroelectric liquid crystals 102 operate as a half-wavelength plate, thus the polarization state after being emitted becomes linear polarization that oscillates at an angle of 45° from the Y' axis in the second quadrant and the fourth quadrant as Equation (13).

[Equation 13]

$$\frac{1}{\sqrt{2}}\begin{bmatrix} 1 & 0 \\ 0 & -1 \end{bmatrix}\begin{bmatrix} 1 \\ 1 \end{bmatrix} = \frac{1}{\sqrt{2}}\begin{bmatrix} 1 \\ -1 \end{bmatrix} \quad (13)$$

Thereafter, the linear polarization is then incident into the quarter wavelength film 111, and is converted into right-handed circular polarization as the following Equation.

[Equation 14]

$$\frac{1}{\sqrt{2}}\begin{bmatrix} 1 & 0 \\ 0 & i \end{bmatrix}\begin{bmatrix} 1 \\ -1 \end{bmatrix} = \frac{1}{\sqrt{2}}\begin{bmatrix} 1 \\ -i \end{bmatrix} \quad (14)$$

As in the foregoing, the rotation direction of circular polarization to be emitted can be controlled based on the state (+State and −State) of the applied voltage to each cross pixel.

Figure 18:
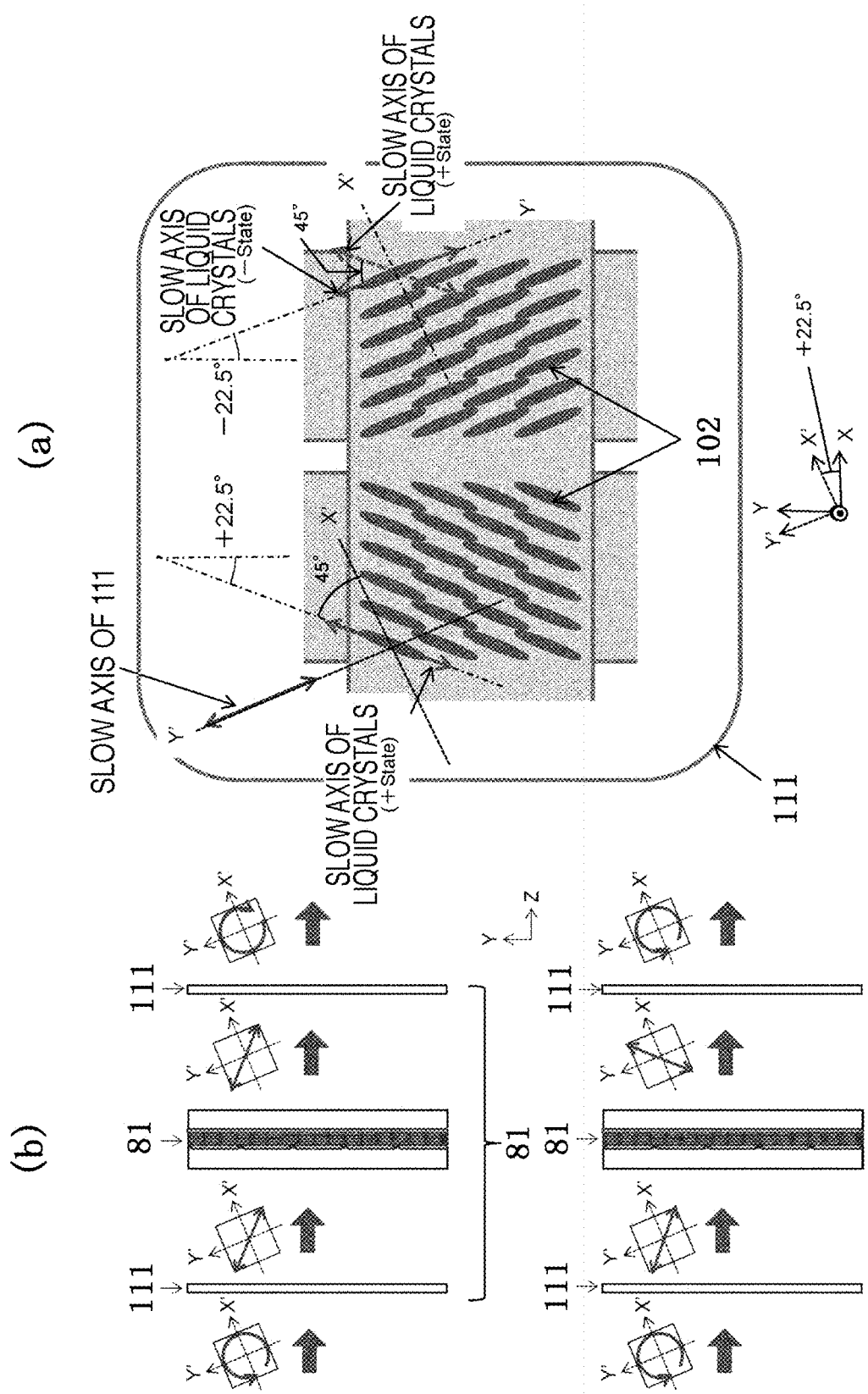
FIG. 18 is an explanation view in a case where incident circular polarization is left-handed circular polarization, as an operation of another form of the N×M transmissive birefringence modulator that constitutes the one embodiment of the present invention.

Next, a case where left-handed circular polarization is incident into the quarter wavelength films 111 is considered using FIG. 18.

FIG. 18(a) illustrates a front view, and FIG. 18(b) illustrates a side view. The N×M transmissive birefringence modulator 81 operates as a half-wavelength plate.

The applied voltage is controlled so as to be in a state of +State (Vx=+5 (V) and Vy=−5 (V)).

When the Slow axis of the quarter wavelength film 111 is disposed being inclined at 22.5° from the coordinates Y axis, the angle of the Slow axis (in a case of +State) of the liquid crystal becomes 45°.

Herein, for convenience, the coordinates system (X' and Y') is considered changing from the coordinates system (X and Y). Similar to the previous discussion, a Jones matrix in the coordinates system (X' and Y') of the quarter wavelength film 111 is given by Equation (10).

The incident light is left-handed circular polarization this time, thus, the polarization to be outputted becomes linear polarization that oscillates at an angle of 45° from the Y' axis in the second quadrant and the fourth quadrant of the coordinates system (X' and Y'), as the following Equation.

[Equation 15]

$$\frac{1}{\sqrt{2}}\begin{bmatrix} 1 & 0 \\ 0 & i \end{bmatrix}\begin{bmatrix} 1 \\ i \end{bmatrix} = \frac{1}{\sqrt{2}}\begin{bmatrix} 1 \\ -1 \end{bmatrix} \quad (15)$$

Herein, the state of +State is considered, thus, the Slow axis of the director of the liquid crystal of the N×M transmissive birefringence modulator 81 is inclined at 45 from the X' axis, in other words, the Fast axis (orthogonal to the Slow axis) of the director of the liquid crystal is inclined at 45° from the Y' axis.

Therefore, the Fast axis matches the direction of incident linear polarization, so that the linear polarization is stored, and is emitted from the N×M transmissive birefringence modulator 81.

Thereafter, the linear polarization is then incident into the quarter wavelength film 111, and is converted into right-handed circular polarization as the following Equation.

[Equation 16]

$$\frac{1}{\sqrt{2}}\begin{bmatrix} 1 & 0 \\ 0 & i \end{bmatrix}\begin{bmatrix} 1 \\ -1 \end{bmatrix} = \frac{1}{\sqrt{2}}\begin{bmatrix} 1 \\ -i \end{bmatrix} \quad (16)$$

Next, the applied voltage is controlled so as to be in a state of −State ((Vx=−5 (V) and Vy=+5 (V)).

The discussion before polarization is incident into the N×M transmissive birefringence modulator 81 is the same as the abovementioned discussion, thus, polarization incident into the N×M transmissive birefringence modulator 81 is linear polarization that oscillates at an angle of 45° from the Y' axis.

Because the state is −State, the Slow axis of the director of the liquid crystal of the N×M transmissive birefringence modulator 81 is changed at 45° from the +State, in other words, in parallel with the Y' axis.

The ferroelectric liquid crystals 102 operate as a half-wavelength plate, thus the polarization state after being emitted becomes linear polarization that oscillates at an angle of 45° from the Y' axis in the first quadrant and the third quadrant as the following Equation.

[Equation 17]

$$\frac{1}{\sqrt{2}}\begin{bmatrix} 1 & 0 \\ 0 & -1 \end{bmatrix}\begin{bmatrix} 1 \\ -1 \end{bmatrix} = \frac{1}{\sqrt{2}}\begin{bmatrix} 1 \\ 1 \end{bmatrix} \quad (17)$$

Thereafter, the linear polarization is then incident into the quarter wavelength film 111, and is converted into left-handed circular polarization as the following Equation.

[Equation 18]

$$\frac{1}{\sqrt{2}}\begin{bmatrix} 1 & 0 \\ 0 & i \end{bmatrix}\begin{bmatrix} 1 \\ 1 \end{bmatrix} = \frac{1}{\sqrt{2}}\begin{bmatrix} 1 \\ i \end{bmatrix} \quad (18)$$

As in the foregoing, also in the case where the incident light is left-handed circular polarization, the rotation direction of circular polarization to be emitted can be controlled based on the state (+State and −State) of the applied voltage to each cross pixel.

INDUSTRIAL APPLICABILITY

The present patent is used to a ROADM (Reconfigurable Optical Add/Drop Multiplexing) node device, which is necessary for next-generation optical communication systems.

REFERENCE SIGNS LIST

1 pair optical fiber
2 Express Traffic device
3 Add/Drop Traffic device
4 transponder bank # A
5 transponder bank # B
11 switch element 1 (light beam deflecting element)
12 switch element 2
13 switch element 3
14 switch element 4
15 switch element 5
16 switch element 6
21 receiver (RX) bank
22 transmitter (TX) bank
23 optical amplifier
24 1×8 optical splitter
25 1×8 optical switch
26 wavelength variable filter (optical filter)
31 switching engine
32 grating
33 lens
34 input port
35 output port
36 Fourier lens
41 electronic circuit substrate
42 metal electrode
43 glass substrate
44 transparent electrode
45 liquid crystal
51 optical fiber array
52 micro lens array
53 two-dimensional MEMS mirror
54 mirror
55 drive electrode
56 hinge
61 half-wavelength plate 62 polarization grating
80 light beam deflecting element
81 N×M transmissive birefringence modulator
82 polarization grating
82a polarization grating (a polarization axis of which is rotated by 90°)
90 pixel
91 electronic circuit (TFT (Thin Film Transistor))
92 liquid crystal
93 silicon substrate
94 transparent electrode (one plane)
95 transparent electrode (rectangular shape)
96 silicon substrate
97 light beam
100 electrode
101 electrode
102 ferroelectric liquid crystal
111 quarter wavelength film
140 collimator attached fiber array
141a cylindrical lens A
141b cylindrical lens B
141c cylindrical lens C
141d cylindrical lens D
142 grating
143 wavelength cross-connect optical system
144a input section
144b output section
150 Fourier lens
151 input and output collimator attached two-dimensional fiber array
152 cross-connect optical system

The invention claimed is:

1. A light beam deflecting element comprising:
an active type N×M transmissive birefringence modulator including:
a first substrate portion having a first substrate and N×M rectangular pixels which is arranged in a matrix form on the first substrate, wherein the first substrate is a Si substrate or a Ge substrate, each of the pixels is formed by an electronic circuit and a transparent electrode, the matrix form is configured by N pixels along a X axis direction and M pixels along a Y axis direction, and the X and Y directions are orthogonal,
a second substrate portion having a second substrate and a transparent electrode formed on the second substrate so as to cover one surface of the second substrate all over with the transparent electrode, wherein the second substrate is a Si substrate or a Ge substrate, and
birefringent liquid crystals inserted between the first substrate portion and the second substrate portion,
wherein the modulator is configured to be fitted on a polarization grating configured by orthogonal first and second axes in which a birefringence axis is rotating in a direction along the first axis at a period that gradually changes in accordance with a wavelength of an incident light, the period is not a constant period, and
the polarization grating is aligned such that the X axis and the first axis or the Y axis and the first axis are substantially in parallel.

2. A light beam deflecting element comprising: a first quarter wavelength film in which light is incident from a back surface of the first quarter wavelength film, and a second quarter wavelength film in which light is emitted from a back surface of the second quarter wavelength film; and a passive matrix type N×M transmissive birefringence modulator inserted between the first and second quarter wavelength films, the modulator including: a first substrate having N line-shaped electrodes along a X axis direction on the first substrate, wherein the first substrate is a Si substrate or a Ge substrate, and a second substrate having M line-shaped electrodes along a Y axis direction on the second substrate, wherein the second substrate is a Si substrate or a Ge substrate, the Y axis is orthogonal to the X axis, and intersections of the N line-shaped electrodes on the first substrate and the M line-shaped electrodes on the second substrate form N×M pixels, and ferroelectric liquid crystals inserted between the N line-shaped electrodes on the first substrate and the M line-shaped electrodes on the second substrate, wherein the modulator is configured to operate as a half-wavelength plate by operating the electrodes forming the pixels, and the second quarter wavelength film is configured to be fitted on a polarization grating configured by orthogonal first and second axes in which a birefringence axis is rotating in a direction along the first axis at a period that gradually changes in accordance with a wavelength of the incident light, the polarization grating is aligned such that the X axis and the first axis or the Y axis and the first axis are substantially in parallel, and the period is not a constant period.

3. The light beam deflecting element according to claim 1, wherein
the polarization grating has a film shape with several micrometers, and
the film shaped polarization grating is directly bonded to the active type N×M transmissive birefringence modulator.

4. The light beam deflecting element according to claim 1, wherein
the period gradually changes by several percent in the direction of the first axis.

5. The light beam deflecting element according to claim 4, wherein
the period gradually changes with respect to the first axis so as to have a constant deflection angle of a wavelength within a predetermined range with respect to the first axis, and the change of the period is a substantially linear change.

6. The light beam deflecting element according to claim 4, wherein
the period changes by a change of ±10% or less.

7. The light beam deflecting element according to claim 1, wherein
by changing voltages applied to the transparent electrode on the first substrate and the transparent electrode on the second substrate of the modulator, an operation by the modulator on light passing through the modulator in a Z-direction changes from an anisotropic birefringent state as in a half wavelength plate or a quarter wavelength plate to an isotropy state where no birefringence is caused, wherein the Z axis is orthogonal to the X and Y axes.

8. A light beam deflecting element according to claim 1, wherein
at least one other light beam deflecting elements is stacked on the light beam deflecting element such that the pixels of the light beam deflecting elements roughly coincide with pixels of said at least one other light beam deflecting element when seen in a direction of the Z axis through which the light passes.

9. The light beam deflecting element according to claim 8, wherein
said at least one other light beam deflecting element is configured to have a structure of the light beam deflecting element, and the period of the polarization gratings of the light beam deflecting element is different from a period of a polarization grating of said at least one other light beam deflecting element with respect to the Z-direction.

10. The light beam deflecting element according to claim 9, wherein
the periods of the polarization gratings of the stacked light beam deflecting elements become smaller and smaller by approximately ½.

11. The light beam deflecting element and said at least one other light beam deflecting elements according to claim 9, wherein
the light beam deflecting elements are stacked such that the periods of the polarization gratings of the stacked light beam deflecting elements gradually become smaller from one side.

12. The light beam deflecting element according to claim 8, wherein
each of the stacked light beam deflecting elements has a thickness 1 mm or less.

13. The light beam deflecting element according to claim 8, wherein
the light beam deflecting element is configured such that at least two or more pixels are included in a spot of an incident light beam.

14. The light beam deflecting element according to claim 8, wherein
the first axis of the polarization grating in the light beam deflecting element is orthogonal to the first axis of the polarization grating in said at least one other light beam deflecting elements.

15. The light beam deflecting element according to claim 1, wherein
the electronic circuit is a thin film transistor.

16. A wavelength cross-connect optical system wherein comprising:
first and second light beam deflecting elements each corresponding to the light beam deflecting element according to claim 1,
a first cylindrical lens having a first focal length, wherein in an approximately middle point between the first and second light beam deflecting elements, a curved surface of the first cylindrical lens is disposed in parallel with a switching plane, and the curved surface is power surface that is a plane on which light is refracted, and
two-second and third cylindrical lenses each having a second focal length, wherein the second cylindrical lens is disposed in a middle point between the first cylindrical lens and the first light beam deflecting element such that the curved surface of the first cylindrical lens and a curved surface of the second cylindrical lens are orthogonal to each other, and the third cylindrical lens is disposed in a middle point between the first cylindrical lens and the second light beam deflecting element such that the curved surface of the first cylindrical lens and a curved surface of the third cylindrical lenses are orthogonal to each other, and
a relation of the following Equation (1) is established between the first focal length and the second focal length: [Equation 1] $F=2F'$ (1), where F indicates the first focal length and F' indicates the second focal length.

17. A wavelength cross-connect device comprising the wavelength cross-connect optical system according to claim 16, a grating, a fiber array, and lenses assembled together.

18. A cross-connect optical system comprising:
two light beam deflecting elements each corresponding to the light beam deflecting element according to claim 1, wherein the two light beam deflecting elements are opposed to each other with an interval of L, and a lens is disposed in an approximately middle point between the two light beam deflecting elements, wherein a focal length of the lens is F, and a relation of the following Equation (2) is established: [Equation 2] $L=2F$ (2).

19. The light beam deflecting element according to claim 2, wherein
the polarization grating has a film shape with several micrometers, and
the film shaped polarization grating is directly bonded on a surface of the second quarter wavelength film.

* * * * *